US009372428B2

(12) United States Patent
Kuroda et al.

(10) Patent No.: US 9,372,428 B2
(45) Date of Patent: Jun. 21, 2016

(54) CHARGING MEMBER AND METHOD FOR MANUFACTURING THE SAME

(75) Inventors: Noriaki Kuroda, Suntou-gun (JP); Noriko Nagamine, Suntou-gun (JP); Yuya Tomomizu, Suntou-gun (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 13/345,477

(22) Filed: Jan. 6, 2012

(65) Prior Publication Data

US 2012/0107565 A1 May 3, 2012

Related U.S. Application Data

(63) Continuation of application No. PCT/JP2011/072492, filed on Sep. 22, 2011.

(30) Foreign Application Priority Data

Sep. 27, 2010 (JP) ................................ 2010-215811

(51) Int. Cl.
*B32B 3/00* (2006.01)
*G03G 15/02* (2006.01)

(52) U.S. Cl.
CPC ..... *G03G 15/0233* (2013.01); *Y10T 428/24479* (2015.01)

(58) Field of Classification Search
None
See application file for complete search history.

(56) References Cited

U.S. PATENT DOCUMENTS 5,200,237 A * 4/1993 Sugama ........................ 427/380
7,664,434 B2 2/2010 Kuroda et al.

(Continued)

FOREIGN PATENT DOCUMENTS

CN 101091140 A 12/2007
CN 101395541 A 3/2009

(Continued)

OTHER PUBLICATIONS

JP 2006293004 A English Machine Translation retrieved from JPO (2006).*

(Continued)

*Primary Examiner* — Kenneth Stachel

(74) *Attorney, Agent, or Firm* — Fitzpatrick, Cella, Harper and Scinto

(57) ABSTRACT

Provided is a charging member having a rough surface, thereby suppressing adhesion of dirt on the surface. A charging member having a supporting member, an elastic layer and a surface layer, in which the surface layer contains a polymer compound, which has a Si—O-M bond and at least one structural unit selected from structural units represented by the following general formula (1) and the following general formula (2), and has a structural unit represented by the following general formula (3); the charging member has cracks developing from the surface thereof and reaching the elastic layer; and the cracks each have convexly raised edges, by which the surface thereof is roughened.

$MO_{4/2}$ General formula (1)

General formula (3)

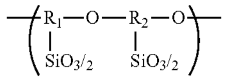

9 Claims, 7 Drawing Sheets

(56) References Cited

U.S. PATENT DOCUMENTS

| | | | | |
|---|---|---|---|---|
| 7,693,457 | B2 | 4/2010 | Kuruma et al. | |
| 7,869,741 | B2 | 1/2011 | Mayuzumi et al. | |
| 7,962,068 | B2 | 6/2011 | Kuroda et al. | |
| 8,064,803 | B2 | 11/2011 | Kuroda et al. | |
| 8,092,358 | B2 | 1/2012 | Kuruma et al. | |
| 8,870,728 | B2 | 10/2014 | Kuruma et al. | |
| 2010/0041851 | A1 | 2/2010 | Katsoulis et al. | |
| 2010/0135695 | A1 | 6/2010 | Mayuzumi et al. | |
| 2010/0226684 | A1 | 9/2010 | Mayuzumi et al. | |
| 2011/0182618 | A1* | 7/2011 | Kuruma et al. | 399/111 |
| 2011/0217072 | A1 | 9/2011 | Kuroda et al. | |
| 2012/0076535 | A1 | 3/2012 | Nagamine et al. | |
| 2012/0076924 | A1 | 3/2012 | Mayuzumi et al. | |
| 2012/0082481 | A1 | 4/2012 | Nagamine et al. | |
| 2012/0093539 | A1 | 4/2012 | Nagamine et al. | |
| 2014/0080691 | A1 | 3/2014 | Kurachi et al. | |

FOREIGN PATENT DOCUMENTS

| | | | | | |
|---|---|---|---|---|---|
| CN | 102203683 | A | | 9/2011 | |
| EP | 1 834 217 | A1 | | 9/2007 | |
| EP | 1 991 915 | A1 | | 11/2008 | |
| JP | 2002-80785 | A | | 3/2002 | |
| JP | 2004037786 | A | * | 2/2004 | G03G 15/02 |
| JP | 2004354489 | A | * | 12/2004 | |
| JP | 2006-64750 | A | | 3/2006 | |
| JP | 2006-162802 | A | | 6/2006 | |
| JP | 2006293004 | A | * | 10/2006 | |
| JP | 2007-4102 | A | | 1/2007 | |
| JP | 2007-264611 | A | | 10/2007 | |
| JP | 2009-9028 | A | | 1/2009 | |
| JP | 2009-151159 | A | | 7/2009 | |
| WO | 2006/070904 | A1 | | 7/2006 | |
| WO | WO 2006070847 | A1 | * | 7/2006 | |
| WO | 2007/100070 | A1 | | 9/2007 | |
| WO | 2011/074220 | A1 | | 6/2011 | |

OTHER PUBLICATIONS

JP 2004037786 A English Machine Translation retrieved from JPO (2004).*

English machine translation of JP 2004354489 (2004).*

Kuroda, et al., U.S. Appl. No. 13/296,202, filed Nov. 14, 2011.

Kuroda, et al., U.S. Appl. No. 13/369,105, filed Feb. 8, 2012.

Tomomizu, et al., U.S. Appl. No. 13/371,200, filed Feb. 10, 2012.

Nagamine, et al., U.S. Appl. No. 13/369,098, filed Feb. 8, 2012.

English translation of International Preliminary Report on Patentability, International Application No. PCT/JP2011/072492, Mailing Date Apr. 25, 2013.

European Search Report dated Oct. 9, 2014 in European Application No. 11829330.7.

Chinese Office Action dated Dec. 1, 2014 in Chinese Application No. 201180046496.0.

* cited by examiner

CHARGING MEMBER AND METHOD FOR MANUFACTURING THE SAME

CROSS-REFERENCE TO RELATED APPLICATIONS

This application is a continuation of International Application No. PCT/JP2011/072492, filed Sep. 22, 2011, which claims the benefit of Japanese Patent Application No. 2010-215811, filed Sep. 27, 2010.

BACKGROUND OF THE INVENTION

1. Field of the Invention

The present invention relates to a charging member used in electrophotographic apparatuses and a method for manufacturing the same.

2. Description of the Related Art

In an electrophotographic apparatus, electrographic members are used, and examples of the electrophotographic member includes a charging member for charging an outer surface of a photosensitive member by being into contact with the outer surface, a developing member for developing an electrostatic latent image formed on the outer surface of the photosensitive member to form a toner image and a cleaning member for removing toner attached to the photosensitive member.

As the charging member used herein, a charging member having a supporting member and an elastic layer (conductive elastic layer) provided on the supporting member is generally employed in view of keeping a sufficient abutting nip with the photosensitive member. Furthermore, to suppress adhesion of a developer, etc., to the surface of the elastic layer, a surface layer is generally provided to the surface of the elastic layer.

Japanese Patent Application Laid-Open No. 2007-004102 discloses a charging member having a surface layer, which is formed of polysiloxane having a fluoroalkyl group and an oxyalkylene group by a so-called sol-gel method. By the presence of a site of a fluoroalkyl group, surface free energy is lowered. By virtue of this, a toner and external additives used in the toner are rarely adhered to the surface even if the member is repeatedly used for a long time. As a result, it is described that the charging member, if it is employed in a DC contact charging system, can be used as a charging member capable of stably charging and outputting images for a long time.

Furthermore, as a method for suppressing adhesion of dirt to the surface of an electrographic member, a method of appropriately roughening the surface of the surface layer by adding coarse particles to the surface layer is known, as described in Japanese Patent Application Laid-Open No. 2009-009028.

SUMMARY OF THE INVENTION

The present inventors studied about the invention set forth in Japanese Patent Application Laid-Open No. 2007-004102, in which an extremely thin surface layer can be formed. This is because reducing the thickness of a surface layer has a structural advantage in further improving charging performance of a charging member. On the other hand, the present inventors tried to add coarse particles to the surface layer formed of polysiloxane as set forth in Japanese Patent Application Laid-Open No. 2007-004102. According to the inventors' trial, it was difficult to form the surface layer having a rough surface. Particularly, it was difficult to disperse coarse particles stably in a coating liquid for forming a surface layer. In consequence, it was difficult to uniformly roughen the surface of the surface layer.

Accordingly, the present invention is directed to provide a charging member having an appropriately roughened surface without using coarse particles and capable of suppressing adhesion of dirt to the surface, and a method for manufacturing the same.

According to one aspect of the present invention, there is provided a charging member comprising a supporting member, an elastic layer and a surface layer, wherein the surface layer comprises a polymer compound having a Si—O-M bond; and the polymer compound has at least one structural unit selected from structural units represented by the following general formula (1) and the following general formula (2), and has a structural unit represented by the following general formula (3); and wherein the charging member has a crack extending from the surface thereof to the elastic layer; and the crack has convexly raised edge by which the surface thereof is roughened.

$MO_{4/2}$ General formula (1)

In the general formula (1), M represents an element selected from the group consisting of Ti, Zr and Hf.

$MO_{5/2}$ General formula (2)

In the above general formula (2), M represents an element Ta.

General formula (3)

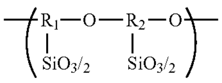

In the above general formula (3), $R_1$ and $R_2$ each independently represent any one of the following general formulas (4) to (7).

General formula (4)

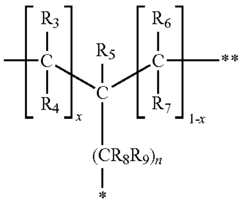

General formula (5)

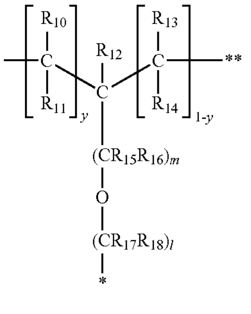

-continued

General Formula (6)

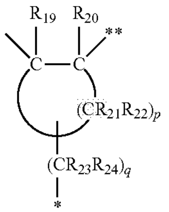

General formula (7)

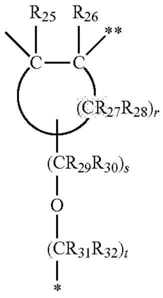

In the above formulas, $R_3$ to $R_7$, $R_{10}$ to $R_{14}$, $R_{19}$, $R_{20}$, $R_{25}$ and $R_{26}$ each independently represent a hydrogen atom, an alkyl group having 1 to 4 carbon atoms, a hydroxy group, a carboxyl group or an amino group; $R_8$, $R_9$, $R_{15}$ to $R_{18}$, $R_{23}$, $R_{24}$ and $R_{29}$ to $R_{32}$ each independently represent a hydrogen atom or an alkyl group having 1 to 4 carbon atoms; $R_{21}$, $R_{22}$, $R_{27}$ and $R_{28}$ each independently represent a hydrogen atom, an alkoxyl group having 1 to 4 carbon atoms or an alkyl group having 1 to 4 carbon atoms; n, m, l, q, s and t each independently represent an integer of 1 to 8; p and r each independently represent an integer of 4 to 12; x and y each independently represent 0 or 1; and a reference symbol "*" and a reference symbol "**" respectively represent the binding sites to a silicon atom and an oxygen atom in the general formula (3).

According to another aspect of the present invention, there is provided a method for manufacturing a charging member, in which the polymer compound is a cross-linked product of a hydrolyzed condensate of a hydrolyzable compound having a structure represented by the following general formula (12) and at least one of the hydrolyzed condensates of hydrolyzable compounds having structures represented by the following general formulas (13) to (16), comprising:

(i) obtaining a liquid-state condensate comprising a hydrolyzed condensate of a hydrolyzable compound having a structure represented by the general formula (12) and at least one of the hydrolyzed condensates of hydrolyzable compounds having structures represented by the general formulas (13) to (16), (ii) obtaining a coating material for forming a surface layer comprising the liquid-state condensate and a photopolymerization initiator, and (iii) forming a coating film of the coating material on an elastic layer provided on the outer periphery of a supporting member, crosslinking the hydrolyzed condensates by cleaving an epoxy group at $R_{33}$ of the hydrolyzed condensate in the coating film, and forming the surface layer.

$R_{33}—Si(OR_{34})(OR_{35})(OR_{36})$ General formula (12):

$Ti(OR_{37})(OR_{38})(OR_{39})(OR_{40})$ General formula (13):

$Zr(OR_{41})(OR_{42})(OR_{43})(OR_{44})$ General formula (14):

$Hf(OR_{45})(OR_{46})(OR_{47})(OR_{48})$ General formula (15):

$Ta(OR_{49})(OR_{50})(OR_{51})(OR_{52})(OR_{53})$ General formula (16):

In the above general formula (12), $R_{33}$ represents any one of the following general formulas (17) to (20) and $R_{34}$ to $R_{36}$ each independently represent an alkyl group having 1 to 4 carbon atoms. In the above general formulas (13) to (16), $R_{37}$ to $R_{53}$ each independently represent an alkyl group having 1 to 9 carbon atoms.

General formula (17)

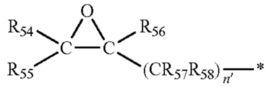

General formula (18)

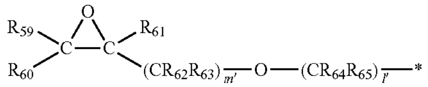

General formula (19)

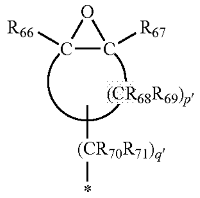

General formula (20)

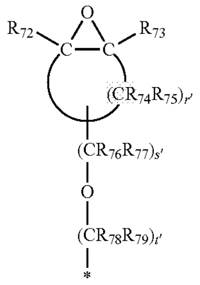

In the general formulas (17) to (20), $R_{54}$ to $R_{58}$, $R_{59}$ to $R_{65}$, $R_{66}$, $R_{67}$ and $R_{72}$, $R_{73}$ each independently represent a hydrogen atom, an alkyl group having 1 to 4 carbon atoms, a hydroxy group, a carboxyl group or an amino group; $R_{57}$, $R_{58}$, $R_{62}$ to $R_{65}$, $R_{70}$, $R_{71}$ and $R_{76}$ to $R_{79}$ each independently represent a hydrogen atom or an alkyl group having 1 to 4 carbon atoms; n', m', l', q', s' and t' each independently represent an integer of 1 to 8; p' and r' each independently represent an integer of 4 to 12; and a reference symbol "*" indicates a binding site with a silicon atom of the general formula (12).

According to still further aspect of the present invention, there is provided a method for manufacturing a charging member, in which the polymer compound is a cross-linked product of a hydrolyzed condensate of a hydrolyzable compound having a structure represented by the above general formula (12), at least one of the hydrolyzed condensates of hydrolyzable compounds having structures represented by the general formulas (13) to (16) and a hydrolyzed condensate of a hydrolyzable compound having a structure represented by the following general formula (21), comprising (i) obtaining a liquid-state condensate comprising a hydrolyzed condensate of a hydrolyzable compound having a structure represented by the above general formula (12), a hydrolyzed condensate of a hydrolyzable compound having a structure represented by the above general formula (21) and at least one of the hydrolyzed condensates of hydrolyzable compounds having structures represented by the above general formulas (13) to (16), (ii) obtaining a coating material comprising the liquid-state condensate and a photopolymerization initiator, for forming a surface layer, and (iii) forming a coating film of the coating material on an elastic layer provided on the outer periphery of a supporting member, crosslinking an epoxy group at $R_{33}$ of the hydrolyzed condensate in the coating film to cure the coating film and forming the surface layer.

$$R_{80}\text{—Si}(OR_{81})(OR_{82})(OR_{83}) \quad \text{General formula (21):}$$

In the general formula (21), $R_{80}$ represents an alkyl group having 1 to 21 carbon atoms or a phenyl group and $R_{81}$ to $R_{83}$ each independently represent an alkyl group having 1 to 4 carbon atoms.

According to the present invention, the number of points in contact with a photosensitive member is limited to thereby reduce a contact area with the photosensitive member. Owing to this, adhesion of a toner and external additives is suppressed even if it is used for a long time, enabling to provide a surface rarely contaminated with dirt. As a result, a charging member capable of maintaining uniform charge for a long time can be obtained.

Further features of the present invention will become apparent from the following description of exemplary embodiments with reference to the attached drawings.

DESCRIPTION OF THE EMBODIMENTS

Figure 1:
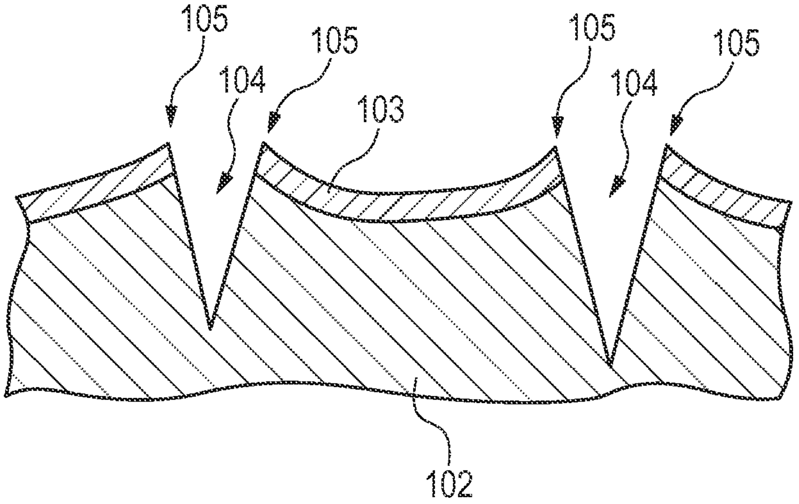
FIG. 1 is a schematic sectional view illustrating the state of cracks in the surface of the charging member according to the present invention.
Figure 2:
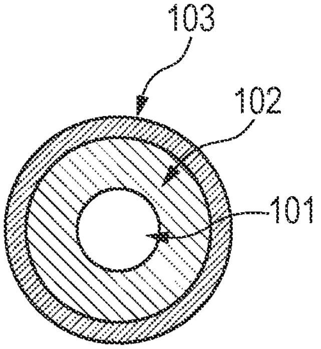
FIG. 2 is a view illustrating a structure of the charging member according to the present invention.

FIG. 2 shows a section of a charging member according to an embodiment of the present invention. The charging member has a supporting member 101, a conductive elastic layer 102 and a surface layer 103. Furthermore, FIG. 1 is an enlarged sectional view of a region nearby the surface of the charging member. The charging member has cracks 104 developing from the surface and reaching the elastic layer 102. The cracks 104 have edge portions 105 convexly raised. Owing to the raised edge portions 105, the surface of the charging member is roughened.

Figure 5A:
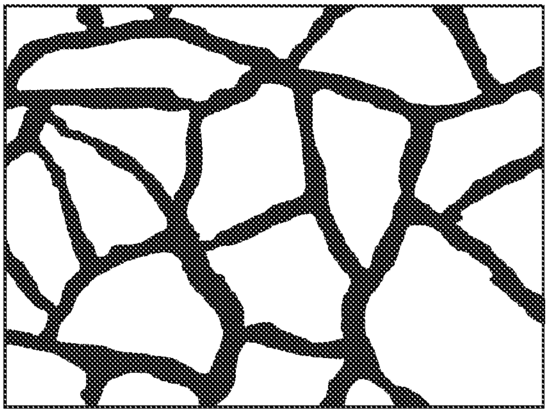
FIGS. 5A and 5B are each an explanatory drawing illustrating the surface state of the charging member according to the present invention.
Figure 5B:
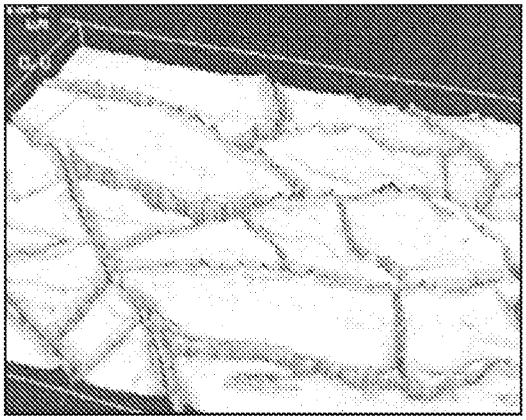
Figure 6A:
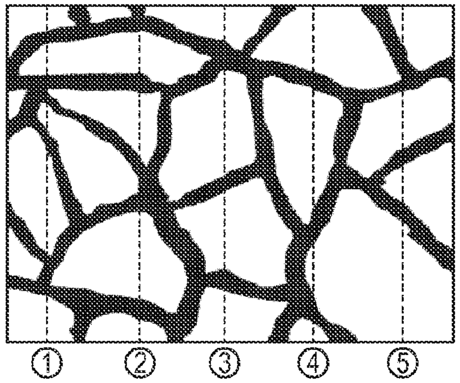
FIGS. 6A and 6B are each an explanatory drawing showing the state of cracks in the surface of the charging member according to the present invention.
Figure 6B:
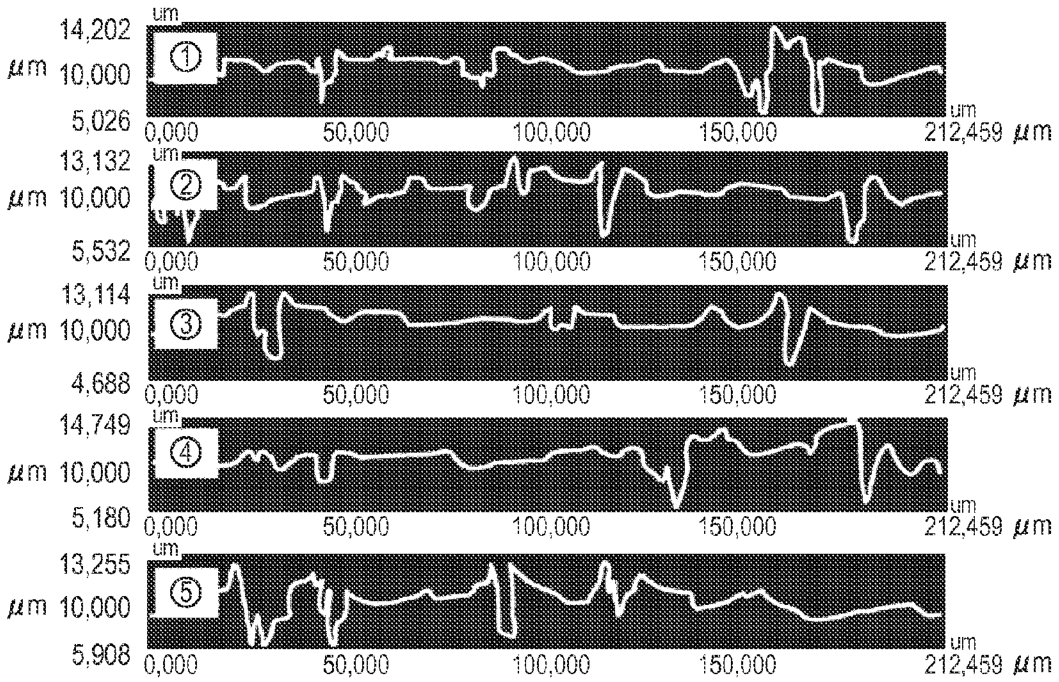

FIG. 5A is a top view of the surface of the charging member (binarized) and FIG. 5B is a bird's eye view thereof. From FIG. 5A, it is found that countless cracks 104 are present in the surface of the charging member. Furthermore, from FIG. 5B, it is found that the edge portions 105 of the cracks 104 are convexly raised. FIG. 6A shows the shape of the cracks 104 present in the surface of the charging member. FIG. 6B shows the convexoconcave states of the surface along with lines 1 to 5 in FIG. 6A. The transverse axis shows the state along with the line (μm), whereas the vertical axis shows the state along with the depth direction (μm). The thickness of the surface layer is 2 μm. As is confirmed from the profiles of FIG. 6B, cracks have a depth of several μm and are developed up to the elastic layer.

Supporting Member

As the supporting member, a supporting member having conductivity is used. Specific examples are as follows: supporting members formed of a metal (or a metal alloy) of iron, copper, stainless steel, aluminum, aluminum alloy or nickel.

Elastic Layer

In the conductive elastic layer, one or two or more elastic materials such as rubber conventionally used in elastic layers (conductive elastic layers) of charging members can be used. Examples of the rubber are as follows: urethane rubber, silicone rubber, butadiene rubber, isoprene rubber, chloroprene rubber, styrene-butadiene rubber, ethylene-propylene rubber, polynorbornene rubber, styrene-butadiene-styrene rubber, acrylonitrile rubber, epichlorohydrin rubber and alkyl ether rubber.

Furthermore, the conductivity of the conductive elastic layer can be set to be a predetermined value by appropriately using a conductant agent in the conductive elastic layer. The electrical resistivity of the conductive elastic layer can be controlled by appropriately selecting the type and use amount of a conductant agent. The electrical resistivity favorably falls within the range of $10^2$ to $10^8\Omega$, and more favorably within the range of $10^3$ to $10^6\Omega$. Furthermore, as the conductant agent for the conductive elastic layer, conductive carbons such as Ketjen black EC, acetylene black, carbon for rubber, oxidized carbon for color (ink) and thermolytic carbon can be used. Furthermore, as the conductant agent for the conductive elastic layer, graphite such as naturally occurring graphite and man-made graphite can be used. To the conductive elastic layer, an inorganic or organic filler and crosslinking agent may be added.

The hardness of the conductive elastic layer is favorably 60° or more and 85° or less and particularly favorably 70° or more and 80° or less in terms of MD-1, in view of suppressing deformation of the charging member when the charging member is brought into contact with a photosensitive member, which is a member to be charged. As long as MD-1 falls within the above range, the depth of cracks in the conductive elastic layer can be easily controlled by use of cure shrinkage of the coating film.

A desired surface roughness (Rz) of the conductive elastic layer is favorably 3.0 μm or more and 12.0 μm or less and particularly favorably 5.0 or more and 10.0 μm or less.

The conductive elastic layer is formed on a supporting member by blending raw materials for the conductive elastic layer by an air-tight mixer, etc. and molding it by a known method such as extrusion molding, injection molding or compression molding. Note that, the conductive elastic layer is, if necessary, adhered on the supporting member via an adhesive. The conductive elastic layer formed on the supporting member is vulcanized as needed. If a vulcanization temperature is rapidly raised, volatile by-products such as a vulcanization accelerator are gasified through a vulcanization reaction to form voids. Accordingly, a heating zone is favorably partitioned into two zones. A first zone is maintained at a temperature lower than the vulcanization temperature to release a gas component and thereafter vulcanization is performed in a second zone.

Surface Layer

The surface layer contains a polymer compound having a Si—O-M bond and the polymer compound contains at least one of the structural units represented by the following general formula (1) and the general formula (2) and at least one of the structural units represented by the following general formula (3).

$MO_{4/2}$ General formula (1)

In the above general formula (1), M represents an element selected from the group consisting of Ti, Zr and Hf.

$MO_{5/2}$ General formula (2)

In the above general formula (2), M represents an element Ta.

General formula (3)

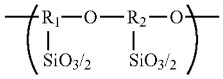

In the above general formula (3), $R_1$ and $R_2$ each independently represent any one of the following general formulas (4) to (7).

General formula (4)

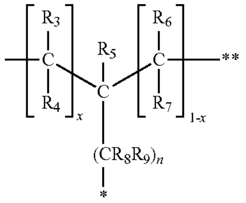

General formula (5)

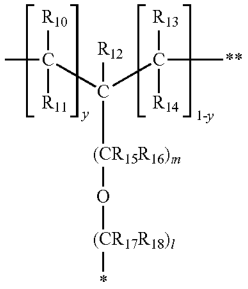

General Formula (6)

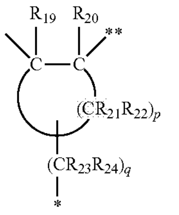

-continued

General formula (7)

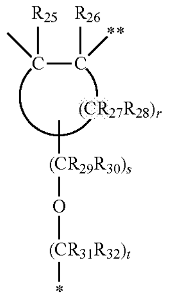

In the above formulas, $R_3$ to $R_7$, $R_{10}$ to $R_{14}$, $R_{19}$, $R_{20}$, $R_{25}$ and $R_{26}$ each independently represent a hydrogen atom, an alkyl group having 1 to 4 carbon atoms, a hydroxy group, a carboxyl group or an amino group; $R_8$, $R_9$, $R_{15}$ to $R_{18}$, $R_{23}$, $R_{24}$ and $R_{29}$ to $R_{32}$ each independently represent a hydrogen atom or an alkyl group having 1 to 4 carbon atoms; $R_{21}$, $R_{22}$, $R_{27}$ and $R_{28}$ each independently represent a hydrogen atom, an alkoxyl group having 1 to 4 carbon atoms or an alkyl group having 1 to 4 carbon atoms; n, m, l, q, s and t each independently represent an integer of 1 to 8; p and r each independently represent an integer of 4 to 12; x and y each independently represent 0 or 1; and a reference symbol "*" and a reference symbol "**" respectively represent the binding sites to a silicon atom and an oxygen atom in the general formula (3).

Figure 10A:
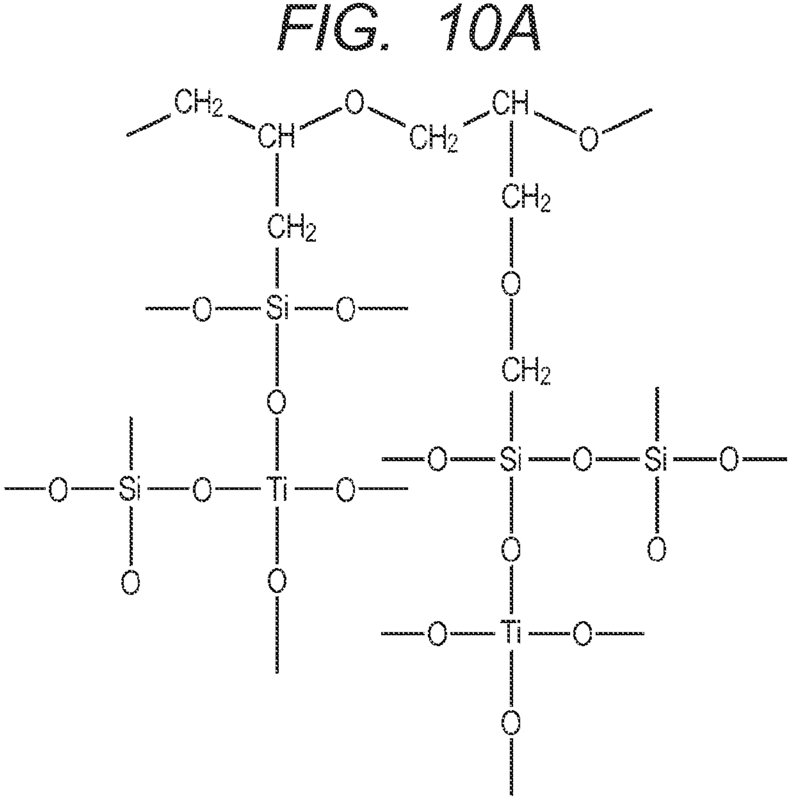
FIGS. 10A and 10B each illustrate a chemical structure of the polymer compound according to the present invention.
Figure 10B:
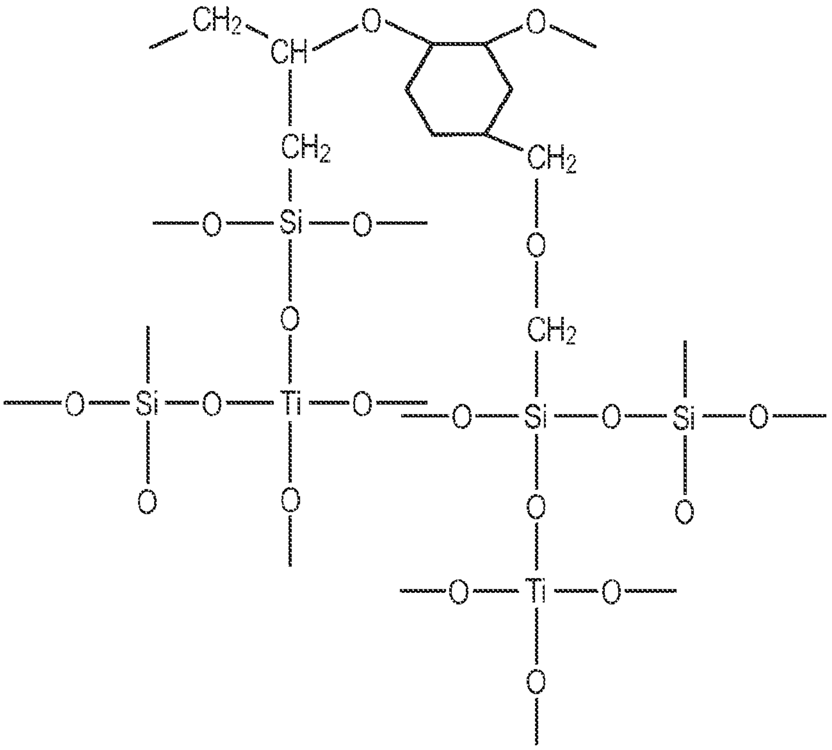

An example of the polymer compound according to the present invention has a structure, which is represented by the formula (3) wherein $R_1$ is represented by the formula (4) and $R_2$ is represented by the formula (5) and has a Si—O—Ti bond in a molecule. The structure of the polymer compound is partly shown in FIG. 10A. Furthermore, another example of the polymer compound according to the present invention has a structure, which is represented by the formula (3) wherein $R_1$ is represented by the formula (4) and $R_2$ is represented by the formula (7) and has a Si—O—Ti bond in a molecule. The structure of the polymer compound is partly shown in FIG. 10B.

In the above polymer compound, it is favorable that $R_1$ and $R_2$ of the above general formula (3) are represented by any of the following general formulas (8) to (11). In this case, owing to the presence of an organic chain, the Modulus of elasticity of the surface layer can be controlled or membrane characteristics of the surface layer, e.g., brittleness and flexibility, can be controlled. Furthermore, adhesion of the elastic layer to the surface layer is improved depending upon the structure of the organic chain, particularly, if an ether site is present.

General formula (8)

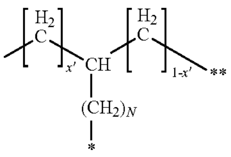

-continued

General formula (9)

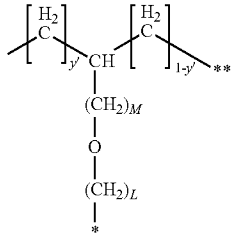

General formula (10)

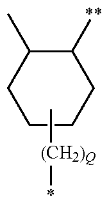

General formula (11)

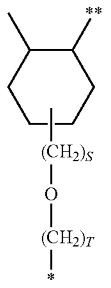

In the formulas, N, M, L, Q, S and T each independently represent an integer of 1 to 8, and x' and y' each independently represent 0 or 1. Furthermore, a reference symbol "*" and a reference symbol "**" respectively represent binding sites to a silicon atom and an oxygen atom of the general formula (3).

In the above polymer compound, the atomic-number ratio of M to silicon (M/Si) is favorably 0.10 to 12.50 and more favorably 0.50 to 10.00. If the value is 0.10 or more, cracks are easily produced by cure shrinkage, producing a surface roughening effect. In contrast, if the value is 12.50 or less, storage stability of the resultant condensate and a dilution solution thereof is ensured.

It is favorable that the above polymer compound is a charging material being a cross-linked product of a hydrolyzed condensate of a hydrolyzable compound having a structure represented by the following general formula (12) and at least one of the hydrolyzed condensates of hydrolyzable compounds having structures represented by the general formulas (13) to (16). More specifically, since the hydrolyzed condensate is significantly shrunken in crosslinking, cracks are generated in the surface layer formed of the cross-linked product. In addition, adhesion property of the hydrolyzed condensate to the elastic layer is extremely high. Therefore, when the hydrolyzed condensate is crosslinked on the elastic layer to form a surface layer, cracks develops up to the elastic layer by contraction force during cross-linkage. As a result, the edge portions of cracks are raised, roughening the surface of the charging member.

$R_{33}$—$Si(OR_{34})(OR_{35})(OR_{36})$ General formula (12):

$Ti(OR_{37})(OR_{38})(OR_{39})(OR_{40})$ General formula (13):

$Zr(OR_{41})(OR_{42})(OR_{43})(OR_{44})$ General formula (14):

$Hf(OR_{45})(OR_{46})(OR_{47})(OR_{48})$ General formula (15):

$Ta(OR_{49})(OR_{50})(OR_{51})(OR_{52})(OR_{53})$ General formula (16):

In the above general formula (12), $R_{33}$ represents any one of the following general formulas (17) to (20) and $R_{34}$ to $R_{36}$ each independently represent an alkyl group having 1 to 4 carbon atoms. Furthermore, in the general formulas (13) to (16), $R_{37}$ to $R_{53}$ each independently represent an alkyl group having 1 to 9 carbon atoms.

General formula (17)

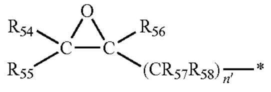

General formula (18)

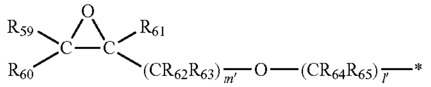

General formula (19)

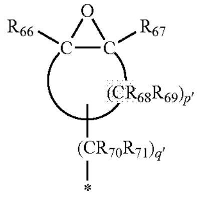

General formula (20)

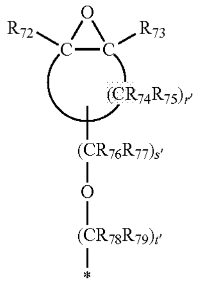

In the general formulas (17) to (20), $R_{54}$ to $R_{58}$, $R_{59}$ to $R_{65}$, $R_{66}$, $R_{67}$, $R_{72}$ and $R_{73}$ each independently represent a hydrogen atom, an alkyl group having 1 to 4 carbon atoms or a hydroxy group, a carboxyl group or an amino group; $R_{57}$, $R_{58}$, $R_{62}$ to $R_{65}$, $R_{70}$, $R_{71}$ and $R_{76}$ to $R_{79}$ each independently represent a hydrogen atom or an alkyl group having 1 to 4 carbon atoms; n', m', l', q', s' and t' each independently represent an integer of 1 to 8; p' and r' each independently represent an integer of 4 to 12; and a reference symbol "*" represents a binding site with a silicon atom of the general formula (12).

Specific examples of a hydrolyzable titanium compound having a structure represented by the general formula (13) will be described below. (13-1): titanium methoxide, (13-2): titanium ethoxide, (13-3): titanium n-propoxide, (13-4): titanium i-propoxide, (13-5): titanium n-butoxide, (13-6): titanium t-butoxide, (13-7): titanium i-butoxide, (13-8): titanium nonyloxide, (13-9): titanium 2-ethylhexoxide, (13-10): titanium methoxypropoxide.

Specific examples of a hydrolyzable zirconium compound having a structure represented by the general formula (14) will be described below. (14-1): zirconium methoxide, (14-2): zirconium ethoxide, (14-3): zirconium n-propoxide, (14-4): zirconium i-propoxide, (14-5): zirconium n-butoxide, (14-6): zirconium t-butoxide, (14-7): zirconium 2-ethylhexoxide, (14-8): zirconium 2-methyl-2-butoxide.

Specific examples of a hydrolyzable hafnium compound having a structure represented by the general formula (15)

will be described below. (15-1): hafnium methoxide, (15-2): hafnium ethoxide, (15-3): hafnium n-propoxide, (15-4): hafnium i-propoxide, (15-5): hafnium n-butoxide, (15-6): hafnium t-butoxide, (15-7): hafnium 2-ethylhexoxide, (15-8): hafnium 2-methyl-2-butoxide.

Specific examples of a hydrolyzable tantalum compound having a structure represented by the general formula (16) will be described below. (16-1): tantalum methoxide, (16-2): tantalum ethoxide, (16-3): tantalum n-propoxide, (16-4): tantalum i-propoxide, (16-5): tantalum n-butoxide, (16-6): tantalum t-butoxide, (16-7): tantalum 2-ethylhexoxide, (16-8): tantalum 2-methyl-2-butoxide.

Specific examples of a hydrolyzable silane compound having a structure represented by the general formula (17) will be described below. (17-1): 4-(1,2-epoxybutyl)trimethoxysilane, (17-2): 4-(1,2-epoxybutyl)triethoxysilane, (17-3): 5,6-epoxyhexyltrimethoxysilane, (17-4): 5,6-epoxyhexyltriethoxysilane, (17-5): 8-oxiran-2-yloctyltrimethoxysilane, (17-6): 8-oxiran-2-yloctyltriethoxysilane.

Specific examples of a hydrolyzable silane compound having a structure represented by the general formula (18) will be described below. (18-1): glycidoxypropyltrimethoxysilane, (18-2): glycidoxypropyltriethoxysilane.

Specific examples of a hydrolyzable silane compound having a structure represented by the general formula (19) will be described below. (19-1): 2-(3,4-epoxycyclohexyl)ethyltrimethoxysilane, (19-2): 2-(3,4-epoxycyclohexyl)ethyl triethoxysilane.

Specific examples of a hydrolyzable silane compound having a structure represented by the general formula (20) will be described below. (20-1): 3-(3,4-epoxycyclohexyl)methyloxypropyltrimethoxysilane, (20-2): 3-(3,4-epoxycyclohexyl) methyloxypropyltriethoxysilane.

Furthermore, it is favorable that the polymer compound is a cross-linked product of a hydrolyzed condensate of a hydrolyzable compound having a structure represented by the general formula (12), at least one of the hydrolyzed condensates of hydrolyzable compounds having structures represented by the general formulas (13) to (16) and a hydrolyzed condensate of a hydrolyzable compound having a structure represented by the following general formula (21). Such a cross-linked product can form cracks of the present invention by cure shrinkage during the production process of the cross-linked product. Furthermore, the material composition of the surface of the charging member can be constituted of a single system containing no filler. Furthermore, the film thickness of the surface layer can be reduced.

$$R_{80}—Si(OR_{81})(OR_{82})(OR_{83}) \qquad \text{General formula (21):}$$

In the general formula (21), $R_{80}$ represents an alkyl group having 1 to 21 carbon atoms or a phenyl group, and $R_{81}$ to $R_{83}$ each independently represent an alkyl group having 1 to 4 carbon atoms.

Specific examples of a hydrolyzable silane compound having a structure represented by the general formula (21) will be described below. (21-1): methyltrimethoxysilane, (21-2): methyltriethoxysilane, (21-3): methyltripropoxysilane, (21-4): ethyltrimethoxysilane, (21-5): ethyltriethoxysilane, (21-6): ethyltripropoxysilane, (21-7): propyltrimethoxysilane, (21-8): propyltriethoxysilane, (21-9): propyltripropoxysilane, (21-10): hexyltrimethoxysilane, (21-11): hexyltriethoxysilane, (21-12): hexyltripropoxysilane, (21-13): decyltrimethoxysilane, (21-14): decyltriethoxysilane, (21-15): decyltripropoxysilane, (21-16): phenyltrimethoxysilane, (21-17): phenyltriethoxysilane, (21-18): phenyltripropoxysilane.

In the case where a hydrolyzable silane compound having a structure represented by the general formula (21) is used in combination, it is favorable that a hydrolyzable silane compound wherein $R_{80}$ is a straight alkyl group having 6 to 10 carbon atoms is used in combination with a hydrolyzable silane compound wherein $R_{80}$ is a phenyl group. In this case, even if a monomer structure is changed by a hydrolyzed and condensation reaction, compatibility to a solvent is satisfactory.

Figure 7:
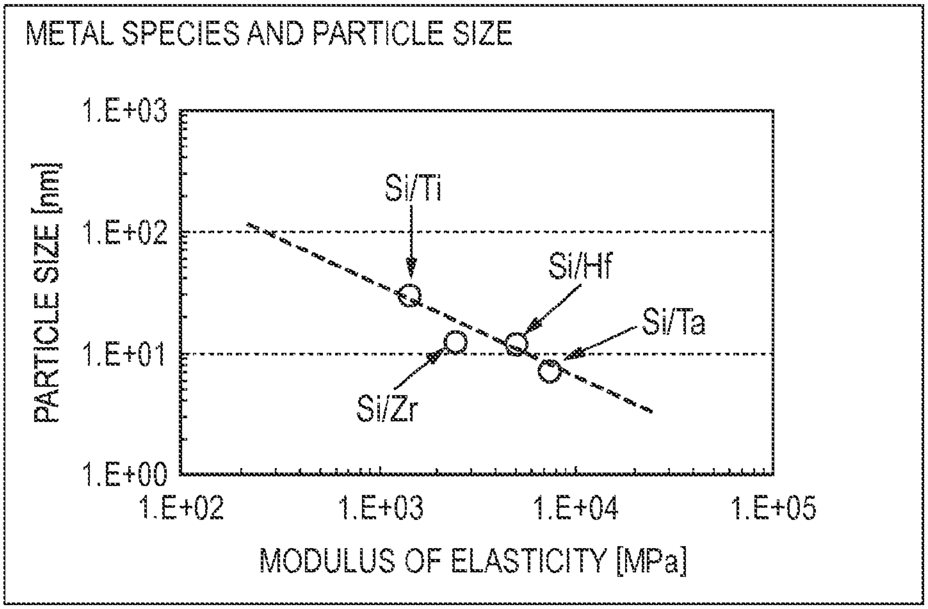
FIG. 7 is a graph illustrating the relationship between the type of metal element in the surface layer according to the present invention and modulus of elasticity.

As metal element M, any element selected from the group consisting of Ti, Zr, Hf and Ta is used. When the relationship between the type of metal element M and the degree of roughness of the surface of the charging member is compared, assuming that, for example, M/Si=2.0, it is found that the size of microparticles generated during the synthesis varies and tends to increase in the order of Ta<Hf<Zr<Ti, as shown in FIG. 7. Although it is not clearly confirmed, difference in reaction rate or number of valences depending upon the type of M presumably reflects. As the size of synthesized particles in a solution decreases, the Modulus of elasticity tends to increase. This is presumably considered that during a coating-film curing process, film (surface layer) density is determined by the size of microparticles and directly influences the Modulus of elasticity of the film. In other words, as the coating film becomes dense, the degree of cure shrinkage of the coating film increases. It is found that the size of microparticles directly influences surface cracks, i.e., cure shrinkage, and influences the raising degree of convex-form edge portions of cracks.

A desired film-thickness of the surface layer is 0.10 to 2.50 μm, particularly 0.15 to 2.00 μm. This is because cracks can be easily developed from the surface layer to the elastic layer by cure shrinkage of a coating film formed of a coating material for forming a surface layer. As a result, the effect of convexly raising edge portions of cracks increases. This is advantageous in roughening the surface. Furthermore, a desired volume resistivity of the surface layer is $10^{10}$ to $10^{16}$ Ω·cm.

The charging member of the present invention has a crack developed by cure shrinkage of a coating film, and the crack extends from the surface of the surface layer to the elastic layer. The edge portion of the crack is convexly raised, thereby roughening the surface of the charging member. The size of the crack can be expressed by surface roughness (Rz) and the depth (Ry) of the crack. Furthermore, the height of convex edge portion of the crack is favorably about 0.5 μm or more and 35.0 μm or less.

In view of suppressing fixation of toner and external additives onto the surface of the charging member as well as controlling surface cracks, the surface roughness (Rz) of the charging member is favorably 5 μm or more and 25 μm or less, particularly favorably 7 μm or more and 22 μm or less and further favorably 10 μm or more and 20 μm or less.

The depth (Ry) of the crack of the charging member refers to the distance between the maximum height of the crack edge portion (convex portion) of the surface layer and the maximum depth of the crack developed after cure shrinkage, extending to the conductive elastic layer. In other words, the depth (Ry) of the crack in the surface of the charging member is inevitably larger than the depth of the crack from the surface of the conductive elastic layer, by the maximum height of the edge portions (convex portion) of the surface layer, which is included in Ry.

Method for Manufacturing a Charging Member

Now, a method for manufacturing the charging member of the present invention will be described below.

The charging member according to the present invention can be manufactured, for example, by a method including the following steps (1) to (3).

Step (1)

A solution mixture, which contains a hydrolyzable silane compound represented by the general formula (12) and at least one element selected from the group consisting of the hydrolyzable compounds represented by the general formulas (13) to (16), an optional hydrolyzable silane compound represented by the general formula (21), water and an alcohol, is heated and refluxed to hydrolyze and condense hydrolyzable compounds in the solution mixture to obtain a liquid-state condensate.

In this step, a "first-stage reaction" and a "second-stage reaction" are favorably included.

First stage reaction: a hydrolyzable silane compound represented by the general formula (12) or hydrolyzable silane compounds represented by the general formula (12) and the general formula (21) are heated to reflux in the presence of water and an alcohol to perform hydrolyzed and condensation, thereby obtaining an intermediate condensate containing a hydrolyzed condensate of the hydrolyzable silane compound.

The second stage reaction: the intermediate condensate and at least one hydrolyzable compound selected from the group of compounds having structures represented by the general formulas (13) to (16) are heated to reflux in the presence of water and an alcohol to perform hydrolyzed and condensation, thereby obtaining a final condensate.

Compared to the rate of the reaction using a hydrolyzable compound of the general formula (12) or hydrolyzable compounds of the general formula (12) in combination with the general formula (21), the rates of the reactions of hydrolyzable compounds of the general formulas (13) to (16) are excessively high. Therefore, if all hydrolyzable compounds are hydrolyzed at a time, only hydrolyzable compounds of the general formulas (13) to (16) selectively react, with the result that white turbidity and precipitation are likely to occur. Thus, a polymer compound uniformly containing an element "M" in a molecule is favorably obtained through a two-stage reaction step as mentioned above. Note that as long as the M/Si ratio is about 0.10 to 0.30 (where concentration of M is low), the reaction can smoothly proceed even if the hydrolyzed and condensation reaction is not divided into two stages. In contrast, if the M/Si ratio is 0.30 to 12.50 (where concentration of M is high), a condensate is favorably prepared in the two-stage reaction, as mentioned above.

Furthermore, the ratio WR (molar ratio) of water addition amount to hydrolyzable silane compounds in synthesizing a hydrolyzed condensate is favorably 0.3 or more and 6.0 or less.

$$WR = \text{water}/\{\text{hydrolyzable compound (12)} + \text{hydrolyzable compound (21)}\} \quad \text{(Expression 1)}$$

The WR value is favorably 1.2 or more and 3.0 or less. As long as the water addition amount falls within the range, the degree of condensation during synthesis is easily controlled. Furthermore, the condensation rate is easily controlled and the storage stability of a hydrolyzed condensate or a diluted solution thereof is effectively improved. Furthermore, it is favorable that the WR value falls within the range. This is because, if so, synthesis can be performed within the range of pH where the epoxy group of the above general formula (12) is not opened.

As the alcohol to be used in synthesizing a condensate, it is favorable to use a primary alcohol alone, a mixture of a primary alcohol and a secondary alcohol, or a mixture of a primary alcohol and a tertiary alcohol. Particularly, a combination of ethanol, methanol and 2-butanol and a combination of ethanol and 2-butanol are favorable.

Step (2)

To the condensate obtained in step (1), if necessary, a photopolymerization initiator is added and if necessary, a solvent is added to appropriately adjust a solid substance concentration to prepare a coating material for forming a surface layer. In controlling the solid substance concentration of a condensate, an appropriate solvent in view of volatility may be used other than the solvent used in synthesis, in order to improve the coating property of a coating material. Examples of the appropriate solvent include 2-butanol, ethyl acetate, methylethyl ketone or a mixture thereof. Furthermore, in the crosslinking reaction of a condensate in the step (3) described later, in view of improving crosslinking efficiency, a cationic polymerization catalyst serving as a photopolymerization initiator is favorably added to a coating material. For example, since the epoxy group shows high reactivity to an onium salt of a Lewis acid activated by an activation energy beam, when an epoxy group is contained as the cationic polymerizable group, an onium salt of a Lewis acid is favorably used as a cationic polymerization catalyst.

As other cationic polymerization catalysts, for example, a borate salt, a compound having an imide structure, a compound having a triazine structure, an azo compound and a peroxide are mentioned. Of various cationic polymerization catalysts, in view of sensitivity, stability and reactivity, an aromatic sulfonium salt and an aromatic iodonium salt are favorable. Particularly, a bis(4-tert-butylphenyl)iodonium salt, a compound having a structure represented by the following chemical formula (22) (trade name: Adeka Optomer-SP150, manufactured by ADEKA Corporation) and a compound having a structure represented by the following chemical formula (23) (trade name: IRGACURE 261, manufactured by Ciba Specialty Chemicals Inc.) are favorable.

Chemical formula (22)

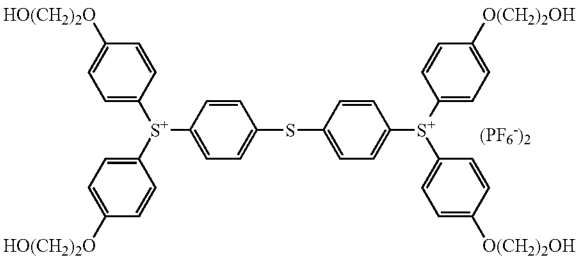

Chemical formula (23)

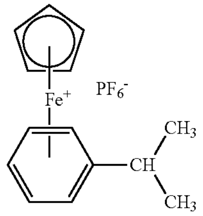

Furthermore, the addition amount of cationic polymerization catalyst serving as a photopolymerization initiator is favorably 1.0 to 3.0 parts by mass relative to the solid substance of a hydrolyzed condensate (100 parts by mass). As long as the addition amount falls within the range, curing characteristics and the solubility of the photopolymerization initiator are satisfactory.

Step (3)

The coating material prepared in the step (2) is applied on the conductive elastic layer formed on a substrate to form a coating film of the coating material. As the coating method, a known method such as coating using a roll coater, dip coating and ring coating can be used.

Next, a cationic polymerizable group contained in a molecule of a condensate of the coating film on the conductive elastic layer is allowed to react, thereby crosslinking the condensate to obtain the polymer compound according to the present invention. To describe it more specifically, for example, an epoxy group contained in a molecule of a condensate is cleaved to form a polymer compound. As a crosslinking method, a method of applying an activation energy beam and a heating method are mentioned. Consequently, a condensate is crosslinked and the coating film is cured, constituting a surface layer. As the activation energy beams, UV ray is favorable. This is because if a crosslinking reaction is performed by UV ray, deterioration of the conductive elastic layer caused by heat hysteresis can be suppressed and thus deterioration of electrical characteristics of the conductive elastic layer can be suppressed.

UV ray can be applied by use of a high-pressure mercury lamp, a metal halide lamp, a low-pressure mercury lamp, or an excimer UV lamp. Of these, a UV ray source rich in UV ray having a wavelength of 150 to 480 nm is used. Note that UV ray cumulative light amount is defined as follows:

UV ray cumulative light amount [mJ/$cm^2$]=UV ray intensity [mW/$cm^2$]×irradiation time [*s*]

The cumulative light amount of UV ray can be controlled by irradiation time, lamp output and the distance between an irradiation lamp and the material to be irradiated. Furthermore, the cumulative light amount may be gradually increased or decreased within the irradiation time.

In the case of using a low-pressure mercury lamp, the cumulative light amount of UV ray can be measured by UV-ray cumulative light amount meter (trade name: UIT-150-A, UVD-S254, both are manufactured by Ushio Inc.). Furthermore, in the case of using an excimer UV lamp, UV-ray cumulative light amount can be measured by a UV-ray cumulative light amount meter (trade name: UIT-150-A, VUV-S172, both are manufactured by Ushio Inc.).

Figure 9:
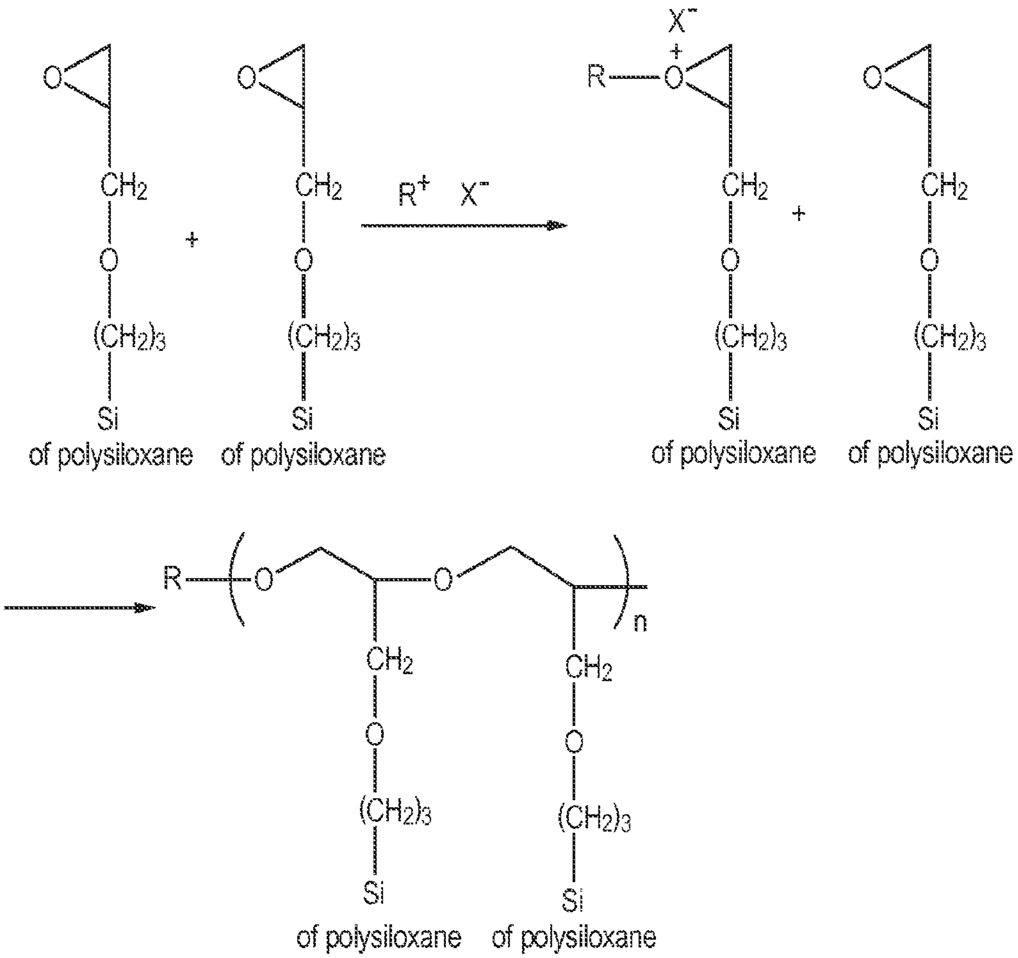
FIG. 9 is an explanatory scheme illustrating a crosslinking reaction according to the present invention.

Crosslinking and curing reactions occurring during the process for forming a polymer compound according to the present invention will be described with reference to FIG. 9. For example, a condensate, which is obtained by hydrolyzing 3-glycidoxypropyltrimethoxysilane serving as a compound represented by the above general formula (12) and at least one hydrolyzable compound selected from the group consisting of those represented by the above general formulas (13) to (16), has an epoxy group as a cationic polymerizable group. In the epoxy group of such a condensate, since an epoxy ring is opened in the presence of a cationic polymerization catalyst (expressed by $R^+X^-$ in FIG. 9), polymerization consequently proceeds in a chain-reaction manner. As a result, polysiloxanes containing $MO_{4/2}$ or $MO_{5/2}$ are mutually crosslinked and cured to form a polymer compound according to the present invention. Note that, in FIG. 9, n is an integer of 1 or more.

Electrophotographic Apparatus, Process Cartridge

Figure 3:
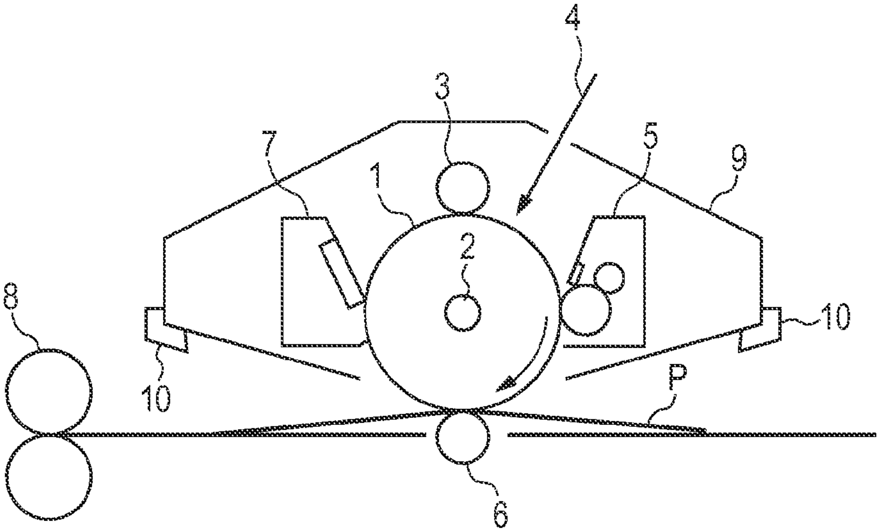
FIG. 3 is a sectional view illustrating an electrophotographic apparatus according to the present invention.

FIG. 3 shows a schematic structure of an electrophotographic apparatus provided with a process cartridge having the charging member of the present invention. The electrophotographic apparatus has a cylindrical photosensitive member 1, which is rotatory driven at a predetermined circumferential speed about a shaft 2 in the direction indicated by the arrow. The photosensitive member may have a supporting member and a photosensitive layer, a charge injection layer, a surface layer, etc. formed on the supporting member.

The surface of the photosensitive member rotatory driven is uniformly charged positively or negatively to a predetermined potential by a charging member 3, and subsequently irradiated with exposure light (image exposure light) 4 emitted from a light exposure unit (not shown in the figure) such as a slit light exposure unit or a laser beam scanning light exposure unit to form an electrostatic latent image corresponding to a desired image.

Figure 4:
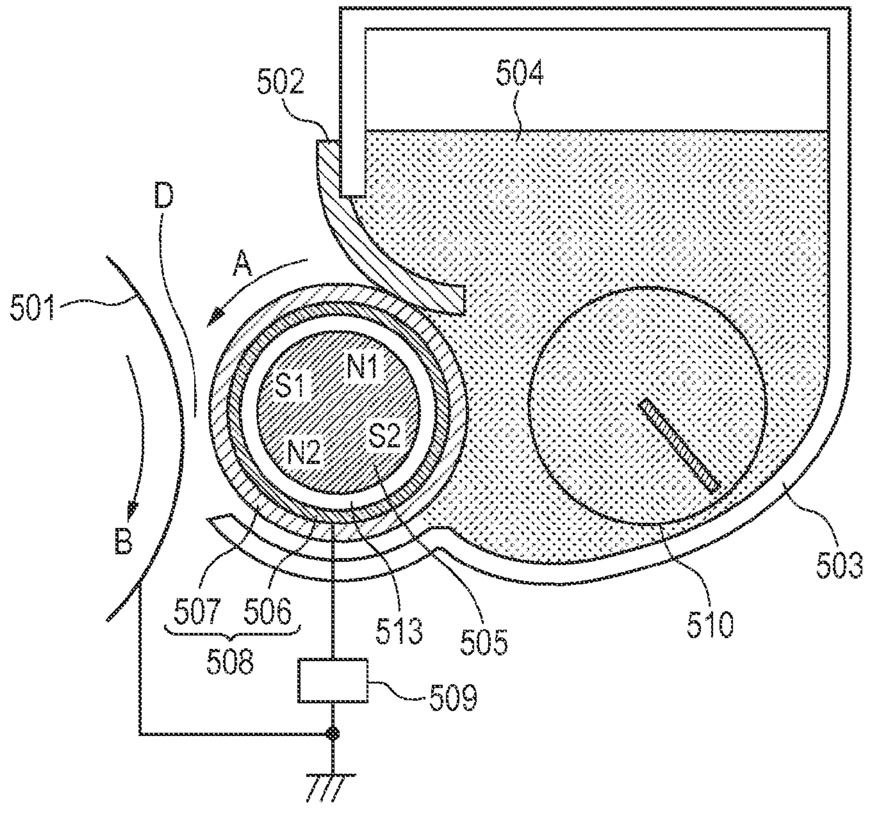
FIG. 4 is a schematic view illustrating a developing apparatus.

In charging the surface of the photosensitive member 1 by the charging member 3, a direct voltage or a voltage obtained by superimposing an alternate-current voltage to a direct-current voltage, is applied to the charging member 3 by a voltage application unit (not shown in the figure See FIG. 4 reference number 509). The electrostatic latent image formed on the surface of the photosensitive member 1 is formed into a toner image by supplying a developer to the latent image by a develop roller provided in a developing unit 5 through reversal development or normal development. Subsequently, the toner image on the surface of the photosensitive member 1 is sequentially transferred onto a transfer material P such as a paper sheet, which is fed to the space between the photosensitive member 1 and a transfer roller 6 in synchronisms with the rotation of the photosensitive member, by a transfer bias applied to the transfer roller 6.

As the developing unit, for example, a jumping developing unit, a contact developing unit and a magnetic brushing unit are mentioned. Furthermore, as the transfer roller, a roller having an elastic layer controlled to have a medium resistivity and formed on a supporting member can be used.

The transfer material P having a toner image transferred thereon is separated from the surface of the photosensitive member 1 and introduced into a fixing unit 8, in which the toner image is fixed, and output from the apparatus as an image formed matter (printed matter, copy). In the cases of a two-sided image formation mode and a multi-image formation mode, the image formed matter is introduced into a recirculation feeding mechanism and introduced again to a transfer section.

After a toner image is transferred, the developer (toner) that remains unused in a transfer process is removed by a cleaning unit 7 such as a cleaning blade. In this manner, the surface of the photosensitive member 1 is cleaned and further discharged by pre-exposure light emitted from a pre-light exposure unit and then repeatedly used for image formation. If the charging unit is a contact charging unit, the pre-light exposure is not necessarily used. The photosensitive member 1, charging member 3, developing unit 5 and cleaning unit 7 are integrated in the form of a process cartridge 9, which is detachably attached to an electrophotographic apparatus main body by use of a guiding unit 10 such as a rail. Members other than the aforementioned members, i.e., members appropriately selected from those of a transfer unit are integrated in a cartridge, which can be detachably attached to the electrophotographic apparatus main body.

Furthermore, FIG. 4 shows a schematic sectional view of the developing apparatus serving as the developing unit 5. In FIG. 4, an electrographic photosensitive drum 501, which serves as an electrostatic latent image holder for holding an electrostatic latent image formed by a known process, is rotated in the direction indicated by arrow B. A developing sleeve 508 serving as a developer carrier holds a one-component developer 504 having a magnetic toner, which is supplied by a hopper 503 serving as a developer container and is rotated in the direction indicated by arrow A. With this structure, the developer 504 is fed to a developing region D at which the developing sleeve 508 faces the photosensitive member 501. As shown in FIG. 4, in the developing sleeve 508, a magnet roller 505 housing magnets with poles N1, N2, S1 and S2 in contact therewith is arranged in order to magnetically attract and hold the developer 504 onto the developing sleeve 508.

A developing sleeve 508 used in the developing apparatus of the present invention has a metal cylindrical tube 506 as a substrate and a conductive-resin coating layer 507 formed on the tube by coating. In the hopper 503, a stirring vane 510 is provided for stirring the developer 504. Reference numeral 513 represents a gap, which means that the developing sleeve 508 and the magnet roller 505 are arranged in non-contact with each other. The developer 504 is triboelectrically charged due to friction between magnetic toner particles constituting the developer and friction with the conductive-resin coating layer 507 formed on the developing sleeve 508, such that an electrostatic latent image on the photosensitive drum 501 can be developed. In the example of FIG. 4, a magnetic regulation blade 502 formed of a ferromagnetic metal is provided as a developer-thickness regulation member in order to regulate the thickness of the developer 504 to be fed to the developing region D. The magnetic regulation blade 502 is suspended from the hopper 503 so as to face the surface of the developing sleeve 508 with a gap of about 50 to 500 μm in width interposed between them. Since magnetic lines from a magnetic pole N1 of the magnet roller 505 are converged on the magnetic regulation blade 502, a thin layer of the developer 504 is formed on the developing sleeve 508.

Furthermore, the developer (toner) used in the present invention, regardless of the type thereof, favorably has a mass average particle size within the range of 4 μm or more and 11 μm or less. If such a developer (toner) is used, the charge amount of toner or image quality and image density, etc., are well balanced. As the binder resin for a developer (toner), resins generally known in the art can be used. Examples thereof include a vinyl resin, a polyester resin, a polyurethane resin, an epoxy resin and a phenol resin. Of them, a vinyl resin and a polyester resin are favorable.

With the developer (toner), a charge control agent can be used in combination by adding it to a toner particle (internal addition) or by mixing it with toner particles (external addition), in order to improve charge properties. This is because a charge amount can be optimally controlled in accordance with a developing system by the charge control agent.

Examples of a positive charge control agent include agents modified by nigrosine, a triaminotriphenylmethane dye and a fatty acid metal salt; quaternary ammonium salts such as tributylbenzylammonium-1-hydroxy-4-naphthosulfonate and tetrabutylammoniumtetrafluoroborate; diorganotin oxides such as dibutyltin oxide, dioctyltin oxide and dicyclohexyltin oxide; diorganotin borates such as dibutyltin borate, dioctyltin borate, and dicyclohexyltin borate. These can be used alone or in combination of two or more types. Furthermore, as a negative charge control agent, for example, an organic metal compound and a chelate compound are effective. Examples thereof include aluminum acetylacetonate, iron (II) acetylacetonate and chromium 3,5-ditertiarybutylsalicylate. Particularly, an acetyl acetone metal complex, a mono-azo metal complex and a metal complex or salt of naphthoic acid or salicylic acid are favorable.

In the case where the developer (toner) is a magnetic developer (toner), a magnetic material is blended. Examples of the magnetic materials include metal oxides such as iron oxides including magnetite, maghemite and ferrite; magnetic metals such as Fe, Co, Ni; and alloys between these metals and a metal such as Al, Co, Cu, Pb, Mg, Ni, Sn, Zn, Sb, Be, Bi, Cd, Ca, Mn, Se, Ti, W, and V, and a mixture of these. At this time, the magnetic material may also serve as a colorant.

As the colorant to be blended with the developer (toner), a pigment and a dye conventionally used in this field can be used, and appropriately selected in use. With a developer (toner), a mold release agent is favorably blended. Appropriate examples of the mold release agent include an aliphatic hydrocarbon wax such as a low molecular weight polyethylene, a low molecular weight polypropylene, microcrystalline wax and paraffin wax and wax containing, as a main component, a fatty acid ester such as carnauba wax, Fischer-Tropsch wax, Sasolwax and Montan wax.

Furthermore, it is favorable that an inorganic impalpable powder such as silica, titanium oxide and alumina is externally added to the developer (toner) in order to improve environmental stability, charge stability, developing property, flowability, storage stability and cleaning performance. More specifically, an inorganic impalpable powder is favorably present in the proximity of the developer surface. Of them, silica fine powder is favorable.

EXAMPLES

Now, the present invention will be more specifically described by way of specific examples; however, the present invention is not limited to these. Note that "parts" in Examples means "parts by mass."

[1] Manufacturing and Evaluation of Conductive Elastic Roller

<Manufacturing and Evaluation of Conductive Elastic Roller 1>

Components (1), (2-1), (3), (4) and (5) (the amounts thereof are shown in Table 1) were kneaded in a 6 L kneader for 20 minutes and then components (6) and (7) (the amounts thereof are shown in Table 1) were added and kneaded in an open roll for further 8 minutes to obtain a kneaded product I.

TABLE 1

| | Raw material | Use amount |
|---|---|---|
| (1) | Middle-high nitrile [trade name: JSP N230SV (the bonded acrylonitrile amount 35.0%), Mooney viscosity (ML1 + 4 100° C.)32, specific gravity 0.98, manufactured by JSR] | 100 parts |
| (2-1) | Carbon black for color [trade name: #7360SB, particle size 28 nm, nitrogen absorption specific surface area 77 $m^2/g$, DBP adsorption amount 87 $cm^3/100$ g, Tokai Carbon Co., Ltd.] (filler) | 48 parts |
| (3) | Calcium carbonate (filler) [trade name: Nanox #30, Maruo Calcium Co., Ltd.] | 20 parts |
| (4) | Zinc oxide | 5 parts |
| (5) | Zinc stearate | 1 part |
| (6) | Tetrabenzylthiuramdisulfide [trade name: Sanceler TBZTD, manufactured by Sanshin Chemical Industry Co., Ltd.] (vulcanization accelerator) | 4.5 parts |
| (7) | Sulfur (vulcanizing agent) | 1.2 parts |
| (2-2) | Carbon black for color [trade name: #1170, particle size 21 nm, nitrogen absorption specific surface area 110 $m^2/g$, DBP absorption amount 55 $cm^3/100$ g, manufactured by Columbian Carbon Japan Ltd.] | 26 parts |
| (2-3) | Carbon black SRF-LM carbon [trade name: HTC#SL, SHINIKKA CARBON Co., Ltd.] | 60 parts |

Next, to the surface regions of a cylindrical steel supporting member (having a surface nickel plated) having a diameter of 6 mm and a length of 252 mm, sandwiching the middle point of the cylinder in the shaft direction and extended up to 115.5 mm on each side (regions in total having a width of 231 mm in the shaft direction), a thermosetting adhesive containing a metal and a rubber (trade name: Metalock N-33, manufactured by ToyoKagaku Kenkyusho Co., Ltd.) was applied and dried for 30 minutes at a temperature of 80° C., and thereafter, dried for further one hour at a temperature of 120° C.

Next, using a crosshead extruder, kneaded product I was extruded concentrically in a cylindrical shape having an outer diameter of 8.75 to 8.90 mm onto the supporting member provided with the aforementioned adhesive layer and an edge portion was cut off to layer a conductive elastic layer unvulcanized (length: 242 mm) on the outer periphery of the supporting member. As the extruder, an extruder having a cylinder diameter of 70 mm and L/D=20 was used. The temperature conditions during the extrusion process were set as follows: head temperature: 90° C., cylinder temperature: 90° C., and screw temperature: 90° C.

Next, the aforementioned roller was vulcanized by use of a communicating heating furnace having two zones set at different temperatures. The roller was passed through the first zone set at a temperature of 80° C. for 30 minutes and through the second zone set at a temperature of 160° C. for 30 minutes. In this manner, the unvulcanized conductive elastic layer was vulcanized.

The edge portions of the vulcanized conductive elastic layer in the width direction were cut off and the length of the conductive elastic layer in the shaft direction was set to 232 mm. Furthermore, the surface of the conductive elastic layer was polished with a rotatory grind stone to form into a crown shape having an edge diameter of 8.26 mm, a middle diameter of 8.5 mm. This is designated as a conductive elastic roller 1.

Evaluation 1: Evaluation of Conductive Elastic Layer

The surface of the conductive elastic layer of the conductive elastic roller 1 were evaluated for 10-point average roughness (Rz), maximum depth (Ry), hardness and deflection of outer-diameter difference. The results are shown in Table 2. Note that, the maximum depth Ry is measured as follows. From the roughness curve, a standard length is just excised out in the direction of the line indicating average roughness. In the portion excised out, the interval between a peak line and a valley-floor line is measured in the lengthwise magnification direction of the roughness curve. In short, the maximum depth Ry represents, in the standard measurement length, the distance between the maximum height of a crack edge portion (convex portion) and the maximum depth including cracks developed to the conductive elastic layer after cure shrinkage.

Ten-point average roughness (Rz) and the maximum depth (Ry) were measured in accordance with Japanese Industry standard (JIS) B0601 (1994). Measurement conditions used herein were as follows: an evaluation length: 8.0 mm, a cut off value: 0.8 mm, a feed rate: 0.5 mm/s, a filter characteristic: 2CR.

Hardness was measured by a micro rubber hardness meter (MD-1 capa, manufactured by Kobunshi Keiki Co., Ltd.). Furthermore, deflection was measured by high-precision laser measuring machine, LSM-430v, manufactured by Mitutoyo Corporation. To be more specific, the outer diameter was measured by the measuring machine and the difference between the maximum outer diameter and the minimum outer diameter was determined as an outer-diameter difference. The measurement was performed at 5 points and the average value of the outer-diameter difference of the 5 points was determined as a deflection of the measured material.

<Manufacturing and Evaluation of Conductive Elastic Rollers 2 to 7>

A conductive elastic roller 2 and conductive elastic roller 3 were obtained in the same manner as in the conductive elastic roller 1 except that the surface polishing conditions of vulcanized conductive elastic layer were changed.

In addition, conductive elastic roller was obtained in the same manner as in the conductive elastic roller 1 except that a component (2-2) was used in the amount shown in Table 1 in place of the component (2-1). A conductive elastic roller 4, and a conductive elastic roller 5 were obtained in the same manner as in the conductive elastic roller 3 except that the surface polishing conditions of the vulcanized conductive elastic layer of the aforementioned conductive elastic roller were changed.

Furthermore, conductive elastic roller 6 and conductive elastic roller 7 were obtained in the same manner as in conductive elastic roller 1 except that a component (2-3) was used in the amount shown in Table 1 in place of the component (2-1) and the surface polishing conditions of the vulcanized conductive elastic layer were changed. These conductive elastic rollers 2 to 7 were evaluated in the same manner as in conductive elastic roller 1. The evaluation results of conductive elastic rollers 1 to 7 are shown in Table 2 below.

TABLE 2

| Conductive elastic roller No. | Hardness | Deflection of outer-diameter difference | Rzjis (μm) | Ry (μm) |
|---|---|---|---|---|
| 1 | 73 | 18 | 6.3 | 8.8 |
| 2 | 73 | 23 | 7.3 | 10.1 |
| 3 | 73 | 15 | 5.1 | 7.6 |
| 4 | 60 | 28 | 12.0 | 15.1 |
| 5 | 60 | 25 | 6.3 | 8.1 |
| 6 | 85 | 10 | 3.0 | 5.3 |
| 7 | 85 | 12 | 6.3 | 8.8 |

[2] Preparation and Evaluation of Condensate

<Preparation and Evaluation of Condensate 1>

First Stage Reaction

The materials listed in Table 3 below were placed in a 300-ml eggplant flask.

TABLE 3

| | |
|---|---|
| 3-Glycidoxypropyltrimethoxysilane (EP-1) [trade name: KBM-403, manufactured by Shin-Etsu Chemical Co., Ltd.] | 11.56 g (0.049 mol) |
| Hexyltrimethoxysilane (He) [trade name: KBM-3063, manufactured by Shin-Etsu Chemical Co., Ltd.] | 62.11 g (0.301 mol) |
| Ethanol (EtOH), [special grade, Kishida Chemical Co., Ltd.] | 91.87 g |

A football-shape stirring bar (the whole length: 45 mm, diameter: 20 mm) was placed in the eggplant flask. The flask was placed on a stirrer and the content was stirred and mixed at room temperature (25° C.) and a rotation rate of 500 rpm for one minute. Furthermore, the rotation rate of the stirrer was changed to 900 rpm and 11.34 g of ion-exchanged water (pH=5.5) was added dropwise. The solid substance at the time of synthesis was 28.00 mass %.

Subsequently, on a stirrer attached with a mechanism for preventing temperature runaway, an oil bath set at a temperature of 120° C. was placed. In the oil bath, the flask was placed and stirred at a rotation rate of 750 rpm. The content of the flask reached a temperature of 120° C. in 20 minutes. Then, reflux under heating was performed for 20 hours. The first stage reaction was performed in this manner to obtain condensate intermediate 1.

The Second Stage Reaction

The materials listed in Table 4 below were placed in a 300-ml eggplant flask and stirred at room temperature for 3 hours. The second stage reaction was performed in this manner to synthesize final condensate 1.

TABLE 4

| Material | Use amount |
|---|---|
| Condensate intermediate 1 | 167.39 g |
| Titanium n-propoxide (Ti-1) [manufactured by Kojundo Chemical Laboratory Co., Ltd.] | 9.41 g (0.033 mol) |

Evaluation (1): Evaluation of Storage Stability of Condensate 1 Dilution Solution First, the solid substance of condensate 1 was controlled. To describe more specifically, mass (A) of a measure cup made of aluminum was measured. Using the measure cup, condensate 1 (about 2.000 to 3.000 g (B)) was weighed by a precision balance and further allowed to stand still in an oven at a temperature of 200° C. for 30 minutes. After moisture content was vaporized, mass (C) was measured and a solid substance was calculated in accordance with the following expression.

$$\text{Solid matter [mass \%]}=(C-A)/B\times100 \quad \text{(Expression 2)}$$

Subsequently, condensate 1 was diluted with ethanol to control the content of a solid substance to be 1.3 mass %. In this manner, a dilution solution of condensate 1 was obtained.

The storage stability of the resultant condensate 1 dilution solution was evaluated based on the following criteria.

A: Neither white turbidity nor precipitation was observed even if the dilution solution was allowed to stand still for a month.

B: White turbidity was observed in about two weeks.

C: White turbidity was observed in about a week.

D: White turbidity and precipitation were observed at the time of synthesis.

The evaluation results are shown in Table 2.

Evaluation (2): Evaluation of Chemical Structure of a Condensate Hardened Material Next, a hardened material of condensate 1 prepared in the following manner was subjected to measurement by a nuclear magnetic resonance apparatus (trade name: JMN-EX400, manufactured by JEOL) to measure $^{29}$Si-NMR and $^{13}$C-NMR spectra. In this manner, it was confirmed that a structure represented by the general formula (3) is present in the hardened material.

First, an aromatic sulfonium salt [trade name: Adeka optomer SP-150, manufactured by ADEKA Corporation] serving as a photo cation polymerization initiator was diluted with methanol to 10 mass %. Then, the dilution solution of the photo cation polymerization initiator was added such that the liquid amount of the photo cation polymerization initiator is brought to be 3.0 parts by mass based on the solid substance (100 parts by mass) of a condensate 1 dilution solution prepared in the same manner as described in evaluation (1). To this, a solvent in which ethanol and 2-butanol were mixed in a ratio of 1:1 (mass ratio) was added to control a theoretical solid substance concentration to be 7.0 mass %. This was designated as coating liquid 1.

Subsequently, the surface of an aluminum sheet of 100 μm in thickness was degreased and spin-coated with coating liquid 1. As a spin-coat apparatus, 1H-D7 (trade name: manufactured by Mikasa Co., Ltd.). Spin-coat conditions were set as follows: rotation rate: 300 rpm, a rotation time: 2 seconds.

The coating film of coating liquid 1 was dried and irradiated with UV ray having a wavelength of 254 nm to cure the coating film. The cumulative light amount of UV ray applied to the coating film was set to 9000 mJ/cm$^2$. Note that UV ray was applied by use of a low-pressure mercury lamp (manufactured by Harison Toshiba Lighting Corporation). Subsequently, the cured film was removed from the aluminum sheet, and ground by a mortar made of agate to prepare a sample for NMR measurement. The sample was subjected to measurement by a nuclear magnetic resonance apparatus (trade name: JMN-EX400, manufactured by JEOL) to measure $^{29}$Si-NMR spectrum and $^{13}$C-NMR spectrum.

From the $^{29}$Si-NMR spectrum, it was confirmed that a hydrolyzable silane compound having an organic chain containing an epoxy group is condensed to a compound and species in the state of —$SiO_{3/2}$ is present in the condensate. Furthermore, from the $^{13}$C-NMR spectrum, it was confirmed that no epoxy group remains and all epoxy groups are polymerized. From the above, it was confirmed that a structure represented by the general formula (3) is present in the cured film.

<Preparation of Condensates 2 to 19>

<Preparation and Evaluation of Condensate Intermediates 2 to 7>

Condensate intermediates 2 to 7 were prepared in the same manner as in condensate intermediate 1 except that the compositions shown in Table 5 below were employed. Note that the compounds represented by brevity codes (EP-1 to EP-5, He, Ph) in Table 5 are more specifically shown in Table 11.

TABLE 5

| Condensate inter- | Compound of Genera formula (12) | | | | Compound of Genera formula (21) | | | |
|---|---|---|---|---|---|---|---|---|
| mediate No. | EP-1 (g) | EP-2 (g) | EP-3 (g) | EP-4 (g) | He (g) | Ph (g) | $H_2O$ (g) | EtOH (g) |
| 1 | 11.56 | — | — | — | 62.11 | — | 11.34 | 91.87 |
| 2 | 38.35 | — | — | — | 35.53 | — | 10.53 | 94.22 |
| 3 | 11.85 | — | — | — | 31.82 | 37.07 | 11.62 | 84.48 |
| 4 | 69.97 | — | — | — | — | — | 9.61 | 97.26 |
| 5 | — | 77.18 | — | — | — | — | 13.02 | 86.38 |
| 6 | — | — | 75.97 | — | — | — | 7.73 | 93.07 |
| 7 | — | — | — | 68.74 | — | — | 9.04 | 98.97 |

<Preparation and Evaluation of Condensates 2 to 60>

Condensates 2 to 60 were prepared in the same manner as in condensate 1 except that the compositions shown in Tables 6 to 9 below were employed and subjected to evaluation (1) and evaluation (2). The evaluation results are collectively shown in Tables 6 to 9. Note that the compounds represented by brevity codes (Tr-1 to Tr-3, Zr-1 to Zr-3, Hf-1 to Hf-3 and Ta-1 to Ta-3) shown in Tables 6 to 9 are more specifically shown in Table 11.

TABLE 6

| Condensate No. | Condensate intermediate No. | Condensate intermediate Use amount (g) | Compound of Formula (13) Ti-1 (g) | Compound of Formula (13) Ti-2 (g) | Compound of Formula (13) Ti-3 (g) | Ti/Si | Evaluation (1) | Evaluation (2) |
|---|---|---|---|---|---|---|---|---|
| 1 | 1 | 167.39 | 9.41 | — | — | 0.10 | A | present |
| 2 | | 137.99 | 38.81 | — | — | 0.50 | A | present |
| 3 | | 26.69 | 150.11 | — | — | 10.00 | A | present |
| 4 | | 171.96 | 4.84 | — | — | 0.05 | A | present |
| 5 | | 113.16 | 63.64 | — | — | 1.00 | A | present |
| 6 | | 22.02 | 154.78 | — | — | 12.50 | C | present |
| 7 | 2 | 42.73 | 134.07 | — | — | 2.50 | A | present |
| 8 | 3 | 59.50 | 117.30 | — | — | 6.00 | A | present |
| 9 | 4 | 45.81 | 130.99 | — | — | 6.00 | A | present |
| 10 | 5 | 36.21 | 140.59 | — | — | 6.00 | A | present |
| 11 | 6 | 53.56 | 123.24 | — | — | 6.00 | A | present |
| 12 | 7 | 47.88 | 128.92 | — | — | 6.00 | A | present |
| 13 | 1 | 74.86 | — | 101.94 | — | 4.00 | B | present |
| 14 | 1 | 29.90 | — | — | 146.90 | 4.00 | B | present |
| 15 | 1 | 54.40 | 122.40 | — | — | 4.00 | A | present |

TABLE 7

| Condensate No. | Condensate intermediate No. | Condensate intermediate Use amount (g) | Compound of Formula (14) Zr-1 (g) | Compound of Formula (14) Zr-2 (g) | Compound of Formula (14) Zr-3 (g) | Zr/Si | Evaluation (1) | Evaluation (2) |
|---|---|---|---|---|---|---|---|---|
| 16 | 1 | 166.04 | 10.76 | — | — | 0.10 | A | present |
| 17 | | 133.52 | 43.28 | — | — | 0.50 | A | present |
| 18 | | 23.63 | 153.17 | — | — | 10.00 | B | present |
| 19 | | 171.25 | 5.55 | — | — | 0.05 | A | present |
| 20 | | 107.27 | 69.53 | — | — | 1.00 | A | present |
| 21 | | 19.42 | 157.38 | — | — | 12.50 | C | present |
| 22 | 2 | 38.30 | 138.50 | — | — | 6.00 | A | present |
| 23 | 3 | 54.03 | 122.77 | — | — | 6.00 | A | present |
| 24 | 4 | 41.16 | 135.64 | — | — | 6.00 | A | present |
| 25 | 5 | 32.29 | 144.51 | — | — | 6.00 | A | present |
| 26 | 6 | 48.41 | 128.39 | — | — | 6.00 | A | present |
| 27 | 7 | 43.09 | 133.71 | — | — | 6.00 | A | present |
| 28 | 1 | 49.21 | — | 127.59 | — | 4.00 | B | present |
| 29 | 1 | 43.80 | — | — | 133.00 | 4.00 | B | present |
| 30 | 1 | 49.21 | 127.59 | — | — | 4.00 | B | present |

TABLE 8

| Condensate No. | Condensate intermediate No. | Condensate intermediate Use amount (g) | Compound of Formula (15) Hf-1 (g) | Compound of Formula (15) Hf-2 (g) | Compound of Formula (15) Hf-3 (g) | Hf/Si | Evaluation (1) | Evaluation (2) |
|---|---|---|---|---|---|---|---|---|
| 31 | 1 | 161.73 | 15.07 | — | — | 0.10 | A | present |
| 32 | | 120.60 | 56.20 | — | — | 0.50 | A | present |
| 33 | | 17.13 | 159.67 | — | — | 10.00 | C | present |
| 34 | | 168.93 | 7.87 | — | — | 0.05 | B | present |
| 35 | | 13.98 | 162.82 | — | — | 12.50 | B | present |
| 36 | | 91.51 | 85.29 | — | — | 1.00 | B | present |
| 37 | 2 | 28.52 | 148.28 | — | — | 6.00 | B | present |
| 38 | 3 | 41.44 | 135.36 | — | — | 6.00 | B | present |
| 39 | 4 | 30.81 | 145.99 | — | — | 600.00 | C | present |
| 40 | 5 | 23.79 | 153.01 | — | — | 6.00 | C | present |
| 41 | 6 | 36.74 | 140.06 | — | — | 6.00 | C | present |
| 42 | 7 | 32.38 | 144.42 | — | — | 6.00 | C | present |
| 43 | 1 | 46.05 | — | 130.75 | — | 4.00 | B | present |
| 44 | 1 | 31.14 | — | — | 145.66 | 4.00 | B | present |
| 45 | 1 | 37.40 | 139.40 | — | — | 4.00 | B | present |

TABLE 9

| | Condensate intermediate | | Compound of Formula (16) | | | | | |
|---|---|---|---|---|---|---|---|---|
| Condensate No. | No. | Use amount (g) | Ta-1 (g) | Ta-2 (g) | Ta-3 (g) | Ta/Si | Evaluation (1) | Evaluation (2) |
| 46 | 1 | 165.77 | 11.03 | — | — | 0.10 | A | present |
| 47 | | 132.68 | 44.12 | — | — | 0.50 | A | present |
| 48 | | 23.11 | 153.69 | — | — | 10.00 | C | present |
| 49 | | 171.11 | 5.69 | — | — | 0.05 | B | present |
| 50 | | 106.18 | 70.62 | — | — | 1.00 | B | present |
| 51 | | 18.98 | 157.82 | — | — | 12.50 | C | present |
| 52 | 2 | 37.53 | 139.27 | — | — | 6.00 | C | present |
| 53 | 3 | 53.08 | 123.72 | — | — | 6.00 | C | present |
| 54 | 4 | 40.35 | 136.45 | — | — | 6.00 | C | present |
| 55 | 5 | 31.62 | 145.18 | — | — | 6.00 | C | present |
| 56 | 6 | 42.26 | 134.54 | — | — | 6.00 | C | present |
| 57 | 7 | 42.26 | 134.54 | — | — | 6.00 | C | present |
| 58 | 1 | 41.94 | — | 134.86 | — | 4.00 | C | present |
| 59 | 1 | 33.20 | — | — | 143.60 | 4.00 | C | present |
| 60 | 1 | 48.30 | 128.50 | — | — | 4.00 | B | present |

<Preparation and Evaluation of Comparative Condensate 61>

Condensate intermediate 4 was formed into condensate 61, which was subjected to the evaluation (1) and evaluation (2). The results are shown in Table 10.

<Preparation and Evaluation of Comparative Condensates 62 to 65>

Condensates 62 to 65 were prepared in the same manner as condensate intermediate 1 except that the compositions of Table 10 below were employed and subjected to the evaluation (1). The results are shown in Table 10. Note that condensates 62 to 65, since white turbidity and precipitation were produced during synthesis, failed to prepare coating solutions to be subjected to the evaluation (2). Therefore, evaluation (2) was not performed.

TABLE 10

| | Compound of Formula (12) | Compounds of Formulas (13) to (16) | | | | | | | |
|---|---|---|---|---|---|---|---|---|---|
| Condensate No. | EP-1 (g) | Ti-1 (g) | Zr-2 (g) | Hf-1 (g) | Ta-1 (g) | $H_2O$ (g) | EtOH (g) | Evaluation (1) | Evaluation (2) |
| 61 | 69.97 | — | — | — | — | 9.61 | 97.26 | A | present |
| 62 | — | 88.10 | — | — | — | 0.84 | 120.66 | D | — |
| 63 | — | — | 65.68 | — | — | 2.23 | 86.59 | D | — |
| 64 | — | — | — | 37.63 | — | 1.44 | 109.89 | D | — |
| 65 | — | — | — | — | 55.24 | 1.01 | 138.16 | D | — |

TABLE 11

| Abbreviation | | Name | Maker |
|---|---|---|---|
| EP-1 | 3-Glycidoxypropyltri-methoxysilane | 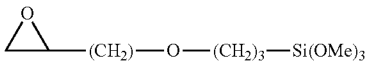 | Shin-Etsu Chemical Co., Ltd. |
| EP-2 | 4-(Trimethoxysilyl)butane-1,2-epoxide | 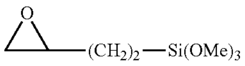 | Carbone Scientific |
| EP-3 | 4-(Trimethoxysilyl)butane-1,2-epoxide | 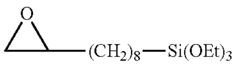 | SiKÉMIA |

TABLE 11-continued

| | Abbreviation | Name | Maker |
|---|---|---|---|
| EP-4 | 2-(3,4-Epoxycyclohexyl) ethyltrimethoxysilane | 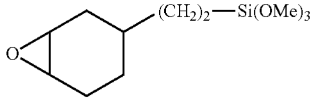 | Shin-Etsu Chemical Co., Ltd. |
| He | Hexyltrimethoxysilane | $H_3C—(CH_2)_5—Si(OMe)_3$ | Shin-Etsu Chemical Co., Ltd. |
| Ph | | 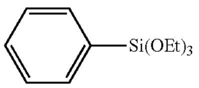 | Shin-Etsu Chemical Co., Ltd. |
| Ti-1 | Titanium i-propoxide | $Ti—(OiPr)_4$ | Kojundo Chemical Laboratory Co., Ltd. |
| Ti-2 | Titanium methoxide | $Ti—(OMe)_4$ | gelest |
| Ti-3 | Titanium nonyloxide | $Ti—(OnC_9H_{19})_4$ | gelest |
| Zr-1 | Zirconium n-propoxide | $Zr—(OnPr)_4$ | gelest |
| Zr-2 | Zirconium i-propoxide | $Zr—(OiPr)_4$ | gelest |
| Zr-3 | Zirconium t-butoxide | $Zr—(OtBu)_4$ | gelest |
| Hf-1 | Hafnium n-butoxide | $Hf—(OnC_4H_9)_4$ | gelest |
| Hf-2 | Hafnium ethoxide | $Hf—(OEt)_4$ | gelest |
| Hf-3 | Hafnium 2-methoxymethyl-2-propoxide | 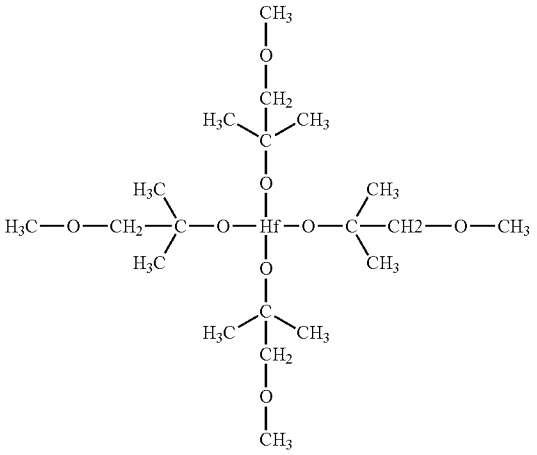 | gelest |
| Ta-1 | Tantalum methoxide | $Ta—(OMe)_5$ | gelest |
| Ta-2 | Tantalum ethoxide | $Ta—(OEt)_5$ | gelest |
| Ta-3 | Tantalum n-butoxide | $Ta—(OnBu)_5$ | gelest |

*Me; Methyl group, Et; Ethyl group

Example 1

Preparation of Charging Rollers 1-1 to 1-3

<Preparation of Coating Materials 1-1 to 1-3 for Forming a Surface Layer>

To condensate 1, a solvent mixture of ethanol:2-butanol=1:1 (mass ratio) was added to adjust a solid substance concentration to 0.7%, 6.6% and 13.1%. These were designated as coating materials No. 1-1, 1-2 and 1-3.

<Formation of Surface Layer>

Three conductive elastic rollers 1 were prepared in the above [1]. To the outer peripheries of the conductive elastic layers of the conductive elastic rollers 1, coating materials No. 1-1 to 1-3 were applied, respectively, by ring coating (ejection amount: 0.120 ml/s, speed of a ring portion: 85 mm/s, total ejection amount: 0.130 ml). To the coating films of respective coating materials formed on the peripheral surfaces of the conductive elastic layers, UV ray having a wavelength of 254 nm was applied such that the cumulative light amount reached 9000 mJ/cm$^2$. In this manner, condensate 1 of the coating material was crosslinked to form a surface layer. Note that irradiation of UV ray was performed by use of a low-pressure mercury lamp (manufactured by Harison Toshiba Lighting Corporation). In this manner, the charging rollers 1-1 to 1-3 were manufactured. The charging rollers were subjected to the following evaluations (3) to (8).

Evaluation (3): Evaluation of Coating Property of Coating Material for Forming a Surface Layer Appearance of the surface of a charging roller was visually observed to evaluate the coating property of a coating material for forming a surface layer based on the following criteria.

A: Coating irregularity was not observed.

B: Coating irregularity was partly observed at roller edges.

C: Coating irregularity was observed in the entire surface.

Evaluation (4): Film Thickness of Surface Layer

For measurement of the film thickness, 4 points in the circumferential direction were picked up in the center portion along the shaft of a charging roller and a sectional direction was observed. At the time, as an observation apparatus, SEM (scanning electron microscope manufactured by HITACHI Ltd.) was used at an acceleration voltage of 5 kV to 20 kV and at a magnification of 10000 times.

Evaluation (5): Modulus of Elasticity of Surface Layer

To the degreased surface of a 100-μm aluminum sheet, a cured film of condensate 1, 5.0 μm in thickness was formed in the same manner as in Evaluation (2). The cured film was subjected to a surface film physical property test (trade name: Fischer scope H 100 V; manufactured by Fischer Instruments K. K.), in which an indenter was allowed to invade into the surface of the object to be measured at a rate of 0.5 μm/7 s. The value at this time was determined as Modulus of elasticity.

Evaluation (6): Evaluation of Cracks in Surface Layer and Measurement of Surface Roughness (Rzjis, Ry)

The surface of each charging roller was observed by use of a color 3D laser microscope (trade name: VK-8700 manufactured by Keyence Corporation) at a magnification ratio of 1000 times (objective lens 50 times). Furthermore, surface roughness (Rzjis, Ry) was calculated by use of analysis software, VK Analyzer.

Evaluation (7): Confirmation of Si—O-M Bond

Figure 8:
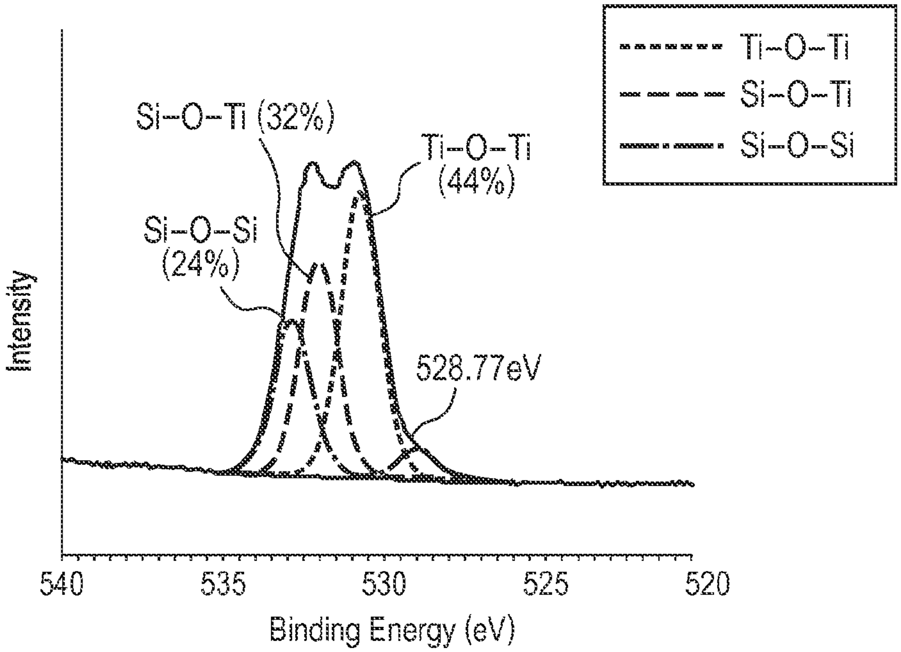
FIG. 8 is an O1s spectrum illustrating analytical results by ESCA.

The presence of a Si—O—Ti bond in the surface layer of each charging roller was confirmed by use of X-ray photoelectron spectrometry (Electron Spectroscopy for Chemical Analysis (ESCA)). More specifically, a roller surface was partly cut out. Subsequently, the cut piece was subjected to sputtering (sputtering conditions: argon gas was used at 1 kV for one minute) to remove dirt on the surface. Thereafter, the cut piece was subjected to an X-Ray photoelectron spectrometry apparatus (trade name: Quantum 2000 manufactured by Ulvac-Phi, Inc., Pass Energy: 140 eV) to analyze a chemical binding mode within the surface layer. The detected O1s spectrum was separated into peaks corresponding to binding modes (Ti—O—Ti binding, Si—O—Ti binding, Si—O—Si binding) (see FIG. 8). Owing to the presence of these peaks, the chemical bindings were confirmed to be present in a surface layer.

Evaluation (8): Image Evaluation of Charging Member

Image evaluation was performed by using each charging roller as follows.

First, each of the charging rollers and an electrographic photosensitive member were integrally supported and installed in a process cartridge (trade name: "HP 35A (CB435A)", manufactured by HP). The process cartridge was fitted to a laser beam printer for outputting a A4 size paper sheet with a longitudinal side as a leading edge (trade name: "HP LaserJet P1006 Printer", manufactured by HP). The print speed of the laser beam printer is 17 sheets/minute and an image resolution is 600 dpi.

Note that the electrographic photosensitive member installed together with a charging roller in the process cartridge is an organic electrographic photosensitive member obtained by forming an organic photosensitive layer of 8.0 μm in thickness on a supporting member. Furthermore, the organic photosensitive layer is a laminate-type photosensitive layer obtained by stacking a charge generation layer and a charge transport layer containing a polycarbonate (a binder resin) in the order from the supporting member. The charge transport layer serves as a surface layer of the electrographic photosensitive member.

Furthermore, the developer (toner) used in the laser beam printer is a mixture of a colorant, a charge control agent, a mold release agent, an inorganic microparticle, etc. added to a binder resin for a developer. As the types of developers, there are a magnetic one-component type developer essentially containing a magnetic material and a non-magnetic one-component type developer containing no magnetic material. The type of developer is appropriately selected depending upon the developing apparatus. Herein, a magnetic one-component developer was used.

An image used herein was formed, on an A4 size paper, by drawing horizontal lines of two dots in width, which is perpendicular to the rotation direction of an electrographic photosensitive member, at the intervals of 118 spaces. Furthermore, output was performed under a 25° C./55% RH environment. Image was formed in a so-called intermittent mode in which rotation of an electrographic photosensitive member is stopped for 7 seconds every time a single paper sheet was printed. In this manner, the image forming operation was performed over two days at an output rate of 1000-image sheets per day. In total, 2000-electrographic image sheets were output. The half tone images thus formed were visually observed for the presence or absence of a transverse streak due to charge failure and the degree thereof, and evaluation was performed based on the following criteria.

AA: No transverse streak due to charge irregularity caused by charge failure was observed.

A: a transverse streak due to charge irregularity was slightly observed at an image edge.

B: a transverse streak due to charge irregularity was clearly observed at an image edge.

C: a transverse streak due to charge irregularity was slightly observed in the entire image surface.

D: a transverse streak due to charge irregularity was observed in the entire image surface.

Examples 2 to 14

Preparation of Coating Materials 2-1 to 2-3, 3-1 to 3-3 for Forming a Surface Layer Coating materials 2-1 to 2-3, 3-1 to 3-3 for forming a surface layer were prepared in the same manner as in coating materials 2-1 to 1-3 except that condensate 2 was used.

<Preparation of Coating Materials 4-1 to 4-3 for Forming a Surface Layer>

To condensate 4, a solvent mixture of ethanol:2-butanol=1:1 (mass ratio) was added to control a solid substance concentration to be 0.3%, 6.6% and, 19.7%. These were designated as coating material Nos. 4-1, 4-2 and 4-3.

<Preparation of Coating Materials 5-1 to 5-2 for Forming a Surface Layer>

To condensate 5, a solvent mixture of ethanol:2-butanol=1:1 (mass ratio) was added to control a solid substance concentration to be 0.3% and 19.7%. These were designated as coating material Nos. 5-1 and 5-2.

<Preparation of Coating Materials 6-1 to 6-3 for Forming a Surface Layer>

To condensate 6, a solvent mixture of ethanol:2-butanol=1:1 (mass ratio) was added to control a solid substance concentration to be 0.3%, 6.6% and 19.7%. These were designated as coating material Nos. 6-1, 6-2 and 6-3.

<Preparation of Coating Materials 7 to 14 for Forming a Surface Layer>

To each of condensates 7 to 14, a solvent mixture of ethanol:2-butanol=1:1 (mass ratio) was added to control a solid substance concentration to be 9.8%. These were designated as coating material Nos. 7 to 14.

<Evaluation of Surface Layer Formation and Charging Roller>

Charging rollers 2-1 to 2-3, 3-1 to 3-3, 4-1 to 4-4, 5-1 to 5-2, 6-1 to 6-3, 7 to 14 were prepared in the same manner as in Example 1 except that the above coating materials were used, and then subjected to evaluations (3) to (8).

Example 15

Preparation of Coating Material 15 for Forming a Surface Layer

To condensate 15, a solvent mixture of ethanol:2-butanol=1:1 (mass ratio) was added to control a solid substance concentration to be 13.1%. This was designated as coating material No. 15.

<Evaluation of Surface Layer Formation and Charging Roller>

Charging rollers 15-1 to 15-6 were prepared in the same manner as in charging roller 1 except that coating material No. 15 was used and conductive rollers 2 to 7 were used in place of the conductive elastic roller 1, and subjected to evaluations (3) to (8).

Examples 16 to 29

Preparation of coating 16-1 to 16-3, 17-1 to 17-3, 18-1 to 18-3 for Forming a Surface Layer Coating material 16-1 to 16-3, 17-1 to 17-3, 18-1 to 18-3 for forming a surface layer were prepared in the same manner as in coating materials 1-1 to 1-3 except that condensates 16 to 18 were used.

<Preparation of Coating Materials 19-1 to 19-3, 21-1 to 21-3 for Forming a Surface Layer>

To each of condensates 19 and 21, a solvent mixture of ethanol:2-butanol=1:1 (mass ratio) was added to control a solid substance concentration to be 0.3%, 6.6% and 19.7%. These were designated as coating material Nos. 19-1 to 19-3, 21-1 to 21-3.

<Preparation of Coating Materials 20-1 to 20-2 for Forming a Surface Layer>

To condensate 20, a solvent mixture of ethanol:2-butanol=1:1 (mass ratio) was added to control a solid substance concentration to be 0.3% and 19.7%. These were designated as coating material Nos. 20-1 and 20-2.

<Preparation of Coating Materials 22 to 29 for Forming a Surface Layer>

To each of condensates 22 to 29, a solvent mixture of ethanol:2-butanol=1:1 (mass ratio) was added to control a solid substance concentration to be 9.8%. These were designated as coating material Nos. 22 to 29.

<Evaluation of Surface Layer Formation and Charging Roller>

Charging rollers 16-1 to 16-3, 17-1 to 17-3, 18-1 to 18-3, 19-1 to 19-3, 20-1 to 20-2, 21-1 to 21-3, 22 to 29 were prepared in the same manner as in Example 1 except that the above coating materials were used, and then subjected to evaluations (3) to (8).

Example 30

Preparation of Coating Material 30 for Forming a Surface Layer

To condensate 30, a solvent mixture of ethanol:2-butanol=1:1 (mass ratio) was added to control a solid substance concentration to be 13.1%. This was designated as coating material No. 30.

<Evaluation of Surface Layer Formation and Charging Roller>

Charging rollers 30-1 to 30-6 were prepared in the same manner as in charging roller 1 except that coating material No. 30 was used and conductive rollers 2 to 7 were used in place of the conductive elastic roller 1 and then subjected to evaluations (3) to (8).

Examples 31 to 44

Preparation of Coating Materials 31-1 to 31-3, 32-1 to 32-3, 33-1 to 33-3 for Forming a Surface Layer Coating materials 31-1 to 31-3, 32-1 to 32-3, 33-1 to 33-3 for forming a surface layer were prepared in the same manner as in coating material 1-1 to 1-3 except that condensates 31 to 33 were used.

<Preparation of Coating Materials 34-1 to 34-3, 36-1 to 36-3 for Forming a Surface Layer>

To each of condensates 34 and 36, a solvent mixture of ethanol:2-butanol=1:1 (mass ratio) was added to control a solid substance concentration to be 0.3%, 6.6% and, 19.7%. These were designated as coating material Nos. 34-1 to 34-3, 36-1 to 36-3.

<Preparation of Coating Materials 35-1 to 35-2 for Forming a Surface Layer>

To condensate 35, a solvent mixture of ethanol:2-butanol=1:1 (mass ratio) was added to control a solid substance concentration to be 0.3% and 19.7%. These were designated as coating material Nos. 35-1 and 35-2.

<Preparation of coating Materials 37 to 44 for Forming a Surface Layer>

To each of condensates 37 to 44, a solvent mixture of ethanol:2-butanol=1:1 (mass ratio) was added to control a solid substance concentration to be 9.8%. These were designated as coating material Nos. 37 to 44.

<Evaluation of Surface Layer Formation and Charging Roller>

Charging rollers 31-1 to 31-3, 32-1 to 32-3, 33-1 to 33-3, 34-1 to 34-3, 35-1 to 35-2, 36-1 to 36-3, 37 to 44 were prepared in the same manner as in Example 1 except that the above coating materials were used and subjected to evaluations (3) to (8).

Example 45

Preparation of Coating Material 45 for Forming a Surface Layer

To condensate 45, a solvent mixture of ethanol:2-butanol=1:1 (mass ratio) was added to control a solid substance concentration to be 13.1%. This was designated as coating material No. 45.

<Evaluation of Surface Layer Formation and Charging Roller>

Charging rollers 45-1 to 45-6 were prepared in the same manner as in charging roller 1 except that coating material No. 45 was used and conductive rollers 2 to 7 were used in place of the conductive elastic roller 1 and subjected to evaluations (3) to (8).

Examples 46 to 60

Preparation of Coating Materials 46-1 to 46-3, 47-1 to 47-3, 48-1 to 48-3 for Forming a Surface Layer Coating materials 46-1 to 46-3, 47-1 to 47-3, 48-1 to 48-3 for forming a surface layer were prepared in the same manner as in coating materials 1-1 to 1-3 except that condensates 46 to 48 were used.

<Preparation of Coating Materials 49-1 to 49-3, 51-1 to 51-3 for Forming a Surface Layer>

To each of condensates 49 and 51, a solvent mixture of ethanol:2-butanol=1:1 (mass ratio) was added to control a solid substance concentration to be 0.3%, 6.6% and, 19.7%. These were designated as coating material Nos. 49-1 to 49-3, 51-1 to 51-3.

<Preparation of Coating Materials 50-1 to 50-2 for Forming a Surface Layer>

To condensate 50, a solvent mixture of ethanol:2-butanol=1:1 (mass ratio) was added to control a solid substance concentration to be 0.3% and 19.7%. These were designated as coating material Nos. 50-1 to 50-2.

<Preparation of Coating Materials 52 to 59 for Forming a Surface Layer>

To each of condensates 52 to 59, a solvent mixture of ethanol:2-butanol=1:1 (mass ratio) was added to control a solid substance concentration to be 9.8%. These were designated as coating material Nos. 52 to 59.

<Evaluation of Surface Layer Formation and Charging Roller>

Charging rollers 46-1 to 46-3, 47-1 to 47-3, 48-1 to 48-3, 49-1 to 49-3, 50-1 to 50-2, 51-1 to 51-3, 52 to 59 were prepared in the same manner as in Example 1 except that the above coating materials were used, and then subjected to evaluations (3) to (8).

Example 60

Preparation of Coating Material 60 for Forming a Surface Layer

To condensate 60, a solvent mixture of ethanol:2-butanol=1:1 (mass ratio) was added to control a solid substance concentration to be 13.1%. This was designated as coating material No. 60.

<Evaluation of Surface Layer Formation and Charging Roller>

Charging rollers 60-1 to 60-6 were prepared in the same manner as in charging roller 1 except that coating material No. 60 was used and conductive rollers 2 to 7 were used in place of the conductive elastic roller 1 and then subjected to evaluations (3) to (8).

The results of evaluations (3) to (8) of charging rollers of Examples 1 to 60 are shown in Tables 12 to 15.

TABLE 12

| Example | Charging roller No. | Conductive elastic roller No. | Coating material No. | Evaluation (3) | (4) [μM] | (5) [GPa] | (6) Presence of cracks | (6) Rzjis [μm] | (6) Ry [μm] | (7) Presence of Si—O—M bond | (8) |
|---|---|---|---|---|---|---|---|---|---|---|---|
| 1 | 1-1 | 1 | 1-1 | A | 0.10 | 0.70 | Yes | 7.3 | 10.1 | Yes | B |
| | 1-2 | | 1-2 | A | 1.00 | 0.70 | Yes | 7.8 | 10.7 | Yes | B |
| | 1-3 | | 1-3 | A | 2.50 | 0.70 | Yes | 8.6 | 11.6 | Yes | B |
| 2 | 2-1 | 1 | 2-1 | A | 0.10 | 2.73 | Yes | 7.8 | 10.7 | Yes | B |
| | 2-2 | | 2-2 | A | 1.00 | 2.73 | Yes | 8.3 | 11.3 | Yes | A |
| | 2-3 | | 2-3 | A | 2.50 | 2.73 | Yes | 9.1 | 12.2 | Yes | A |
| 3 | 3-1 | 1 | 3-1 | A | 0.10 | 7.06 | Yes | 9.8 | 13.1 | Yes | A |
| | 3-2 | | 3-2 | A | 1.00 | 7.06 | Yes | 10.8 | 14.4 | Yes | AA |
| | 3-3 | | 3-3 | A | 2.50 | 7.06 | Yes | 13.3 | 17.6 | Yes | AA |
| 4 | 4 | 1 | 4-1 | A | 0.05 | 0.47 | Yes | 6.8 | 10.0 | Yes | C |
| | 7 | 1 | 4-2 | A | 1.00 | 0.47 | Yes | 8.4 | 13.4 | Yes | A |
| | 9 | 1 | 4-3 | B | 3.00 | 0.47 | Yes | 9.1 | 10.7 | Yes | A |
| 5 | 5 | 1 | 5-1 | A | 0.05 | 2.73 | Yes | 7.3 | 10.1 | Yes | B |
| | 10 | 1 | 5-2 | B | 3.00 | 2.73 | Yes | 10.6 | 12.6 | Yes | AA |
| 6 | 6 | 1 | 6-1 | A | 0.05 | 7.60 | Yes | 9.3 | 12.6 | Yes | A |
| | 8 | 1 | 6-2 | A | 1.00 | 7.60 | Yes | 12.6 | 15.1 | Yes | AA |
| | 11 | 1 | 6-3 | B | 3.00 | 7.60 | Yes | 17.6 | 21.3 | Yes | B |
| 7 | 12 | 1 | 7 | A | 1.50 | 5.22 | Yes | 11.1 | 13.2 | Yes | AA |
| 8 | 13 | 1 | 8 | A | 1.50 | 6.30 | Yes | 11.3 | 13.5 | Yes | AA |
| 9 | 14 | 1 | 9 | A | 1.50 | 6.19 | Yes | 10.7 | 13.2 | Yes | AA |
| 10 | 15 | 1 | 10 | A | 1.50 | 6.43 | Yes | 10.9 | 13.5 | Yes | AA |
| 11 | 16 | 1 | 11 | A | 1.50 | 6.02 | Yes | 9.8 | 13.2 | Yes | A |
| 12 | 17 | 1 | 12 | A | 1.50 | 6.56 | Yes | 10.5 | 14.0 | Yes | AA |
| 13 | 18 | 1 | 13 | A | 1.50 | 7.32 | Yes | 8.7 | 12.5 | Yes | A |
| 14 | 19 | 1 | 14 | A | 1.50 | 6.81 | Yes | 11.1 | 14.4 | Yes | AA |
| 15 | 15-1 | 2 | 15 | A | 2.00 | 7.06 | Yes | 10.5 | 14.1 | Yes | AA |
| | 15-2 | 3 | | A | 2.00 | 7.06 | Yes | 8.3 | 11.6 | Yes | A |
| | 15-3 | 4 | | A | 2.00 | 7.06 | Yes | 16.8 | 18.0 | Yes | AA |
| | 15-4 | 5 | | A | 2.00 | 7.06 | Yes | 11.1 | 12.3 | Yes | AA |
| | 15-5 | 6 | | A | 2.00 | 7.06 | Yes | 4.6 | 7.3 | Yes | C |
| | 15-6 | 7 | | A | 2.00 | 7.06 | Yes | 7.9 | 10.8 | Yes | B |

TABLE 13

| Example | Charging roller No. | Conductive elastic roller No. | Coating material No. | Evaluation (3) | (4) [μm] | (5) [GPa] | (6) Presence of cracks | (6) Rzjis [μm] | (6) Ry [μm] | (7) Presence of Si—O—M bond | (8) |
|---|---|---|---|---|---|---|---|---|---|---|---|
| 16 | 16-1 | 1 | 16-1 | A | 0.10 | 0.49 | Yes | 7.7 | 10.6 | Yes | B |
| | 16-2 | | 16-2 | A | 1.00 | 0.49 | Yes | 8.4 | 11.4 | Yes | A |
| | 16-3 | | 16-3 | A | 2.50 | 0.49 | Yes | 9.5 | 12.7 | Yes | A |
| 17 | 17-1 | 1 | 17-1 | A | 0.10 | 3.74 | Yes | 8.4 | 11.4 | Yes | A |
| | 17-2 | | 17-2 | A | 1.00 | 3.74 | Yes | 9.1 | 12.3 | Yes | A |

TABLE 13-continued

| | Charging roller | | | Evaluation | | | | | | | |
|---|---|---|---|---|---|---|---|---|---|---|---|
| | | Conductive | Coating | | | | (6) | | | (7) | |
| Example | No. | elastic roller No. | material No. | (3) | (4) [μm] | (5) [GPa] | Presence of cracks | Rzjis [μm] | Ry [μm] | Presence of Si—O—M bond | (8) |
| | 17-3 | | 17-3 | A | 2.50 | 3.74 | Yes | 10.2 | 13.6 | Yes | AA |
| 18 | 18-1 | 1 | 18-1 | B | 0.10 | 14.81 | Yes | 11.2 | 14.9 | Yes | AA |
| | 18-2 | | 18-2 | B | 1.00 | 14.81 | Yes | 12.6 | 16.7 | Yes | AA |
| | 18-3 | | 18-3 | B | 2.50 | 14.81 | Yes | 16.1 | 21.1 | Yes | AA |
| 19 | 19-1 | 1 | 19-1 | A | 0.05 | 0.29 | Yes | 7.0 | 10.0 | Yes | B |
| | 19-2 | 1 | 19-2 | A | 1.00 | 0.29 | Yes | 8.3 | 10.1 | Yes | A |
| | 19-3 | 1 | 19-3 | A | 3.00 | 0.29 | Yss | 8.4 | 11.4 | Yes | A |
| 20 | 20-1 | 1 | 20-1 | A | 0.05 | 3.74 | Yss | 7.7 | 10.6 | Yes | B |
| | 20-2 | 1 | 20-2 | A | 3.00 | 3.74 | Yes | 12.6 | 14.1 | Yes | AA |
| 21 | 21-1 | 1 | 21-1 | C | 0.05 | 16.49 | Yes | 10.5 | 14.1 | Yes | AA |
| | 21-2 | 1 | 21-2 | C | 1.00 | 16.49 | Yes | 13.3 | 17.6 | Yes | AA |
| | 21-3 | 1 | 21-3 | C | 3.00 | 16.49 | Yes | 20.3 | 26.3 | Yes | A |
| 22 | 22 | 1 | 22 | A | 1.50 | 9.89 | Yes | 11.5 | 14.9 | Yes | AA |
| 23 | 23 | 1 | 23 | A | 1.50 | 10.02 | Yes | 12.5 | 14.9 | Yes | AA |
| 24 | 24 | 1 | 24 | A | 1.50 | 12.23 | Yes | 11.2 | 14.9 | Yes | AA |
| 25 | 25 | 1 | 25 | A | 1.50 | 12.85 | Yes | 11.7 | 15.7 | Yes | AA |
| 26 | 26 | 1 | 26 | A | 1.50 | 11.62 | Yes | 10.1 | 14.2 | Yes | AA |
| 27 | 27 | 1 | 27 | A | 1.50 | 13.24 | Yes | 12.5 | 16.1 | Yes | AA |
| 28 | 28 | 1 | 28 | A | 1.50 | 14.81 | Yes | 10.5 | 14.1 | Yes | AA |
| 29 | 29 | 1 | 29 | A | 1.50 | 14.31 | Yes | 9.8 | 13.7 | Yes | A |
| 30 | 30-1 | 2 | 30 | B | 2.00 | 14.81 | Yes | 11.8 | 16.5 | Yes | AA |
| | 30-2 | 3 | | B | 2.00 | 14.81 | Yes | 9.6 | 14.0 | Yes | A |
| | 30-3 | 4 | | B | 2.00 | 14.81 | Yes | 18.7 | 21.5 | Yes | AA |
| | 30-4 | 5 | | B | 2.00 | 14.81 | Yes | 13.0 | 17.6 | Yes | AA |
| | 30-5 | 6 | | B | 2.00 | 14.81 | Yes | 5.2 | 8.5 | Yes | C |
| | 30-6 | 7 | | B | 2.00 | 14.81 | Yes | 8.5 | 12.0 | Yes | A |

TABLE 14

| | Charging roller | | | Evaluation | | | | | | | |
|---|---|---|---|---|---|---|---|---|---|---|---|
| | | Conductive | Coating | | | | (6) | | | (7) | |
| Example | No. | elastic roller No. | material No. | (3) | (4) [μm] | (5) [GPa] | Presence of cracks | Rzjis [μm] | Ry [μm] | Presence of Si—O—M bond | (8) |
| 31 | 31-1 | 1 | 31-1 | A | 0.10 | 0.52 | Yes | 7.9 | 10.8 | Yes | B |
| | 31-2 | | 31-2 | A | 1.00 | 0.52 | Yes | 8.7 | 11.8 | Yes | A |
| | 31-3 | | 31-3 | A | 2.50 | 0.52 | Yes | 9.9 | 13.3 | Yes | A |
| 32 | 32-1 | 1 | 32-1 | A | 0.10 | 8.00 | Yes | 8.7 | 11.8 | Yes | A |
| | 32-2 | | 32-2 | A | 1.00 | 8.00 | Yes | 9.5 | 12.8 | Yes | A |
| | 32-3 | | 32-3 | A | 2.50 | 8.00 | Yes | 10.7 | 14.3 | Yes | AA |
| 33 | 33-1 | 1 | 33-1 | C | 0.10 | 54.98 | Yes | 11.9 | 15.8 | Yes | AA |
| | 33-2 | | 33-2 | C | 1.00 | 54.98 | Yes | 13.5 | 17.8 | Yes | AA |
| | 33-3 | | 33-3 | C | 2.50 | 54.98 | Yes | 17.5 | 22.8 | Yes | AA |
| 34 | 34-1 | 1 | 34-1 | B | 0.05 | 0.23 | Yes | 7.1 | 10.0 | Yes | B |
| | 34-2 | 1 | 34-2 | B | 1.00 | 0.23 | Yes | 8.3 | 11.3 | Yes | A |
| | 34-3 | 1 | 34-3 | B | 3.00 | 0.23 | Yes | 8.7 | 11.8 | Yes | A |
| 35 | 35-1 | 1 | 35-1 | B | 0.05 | 8.00 | Yes | 7.9 | 10.8 | Yes | B |
| | 35-2 | 1 | 35-2 | B | 3.00 | 8.00 | Yes | 11.1 | 14.8 | Yes | AA |
| 36 | 36-1 | 1 | 36-1 | C | 0.05 | 62.66 | Yes | 11.1 | 14.8 | Yes | AA |
| | 36-2 | 1 | 36-2 | C | 1.00 | 62.66 | Yes | 14.3 | 18.8 | Yes | AA |
| | 36-3 | 1 | 36-3 | C | 3.00 | 62.66 | Yes | 22.3 | 28.8 | Yes | B |
| 37 | 37 | 1 | 37 | B | 1.50 | 29.45 | Yes | 11.9 | 15.8 | Yes | AA |
| 38 | 38 | 1 | 38 | B | 1.50 | 30.13 | Yes | 12.3 | 16.4 | Yes | AA |
| 39 | 39 | 1 | 39 | C | 1.50 | 41.42 | Yes | 11.9 | 15.8 | Yes | AA |
| 40 | 40 | 1 | 40 | C | 1.50 | 43.22 | Yes | 12.3 | 16.4 | Yes | AA |
| 41 | 41 | 1 | 41 | C | 1.50 | 40.69 | Yes | 10.5 | 14.4 | Yes | AA |
| 42 | 42 | 1 | 42 | C | 1.50 | 41.13 | Yes | 13.2 | 17.1 | Yes | AA |
| 43 | 43 | 1 | 43 | B | 1.50 | 16.32 | Yes | 12.2 | 15.3 | Yes | AA |
| 44 | 44 | 1 | 44 | B | 1.50 | 12.15 | Yes | 10.3 | 13.4 | Yes | AA |
| 45 | 45-1 | 2 | 45 | B | 2.00 | 14.81 | Yes | 12.4 | 16.5 | Yes | AA |
| | 45-2 | 3 | | B | 2.00 | 14.81 | Yes | 10.2 | 14.0 | Yes | AA |
| | 45-3 | 4 | | B | 2.00 | 14.81 | Yes | 19.6 | 21.5 | Yes | AA |
| | 45-4 | 5 | | B | 2.00 | 14.81 | Yes | 13.9 | 17.6 | Yes | AA |
| | 45-5 | 6 | | B | 2.00 | 14.81 | Yes | 5.5 | 8.5 | Yes | C |
| | 45-6 | 7 | | B | 2.00 | 14.81 | Yes | 11.3 | 12.0 | Yes | AA |

TABLE 15

| | | Charging roller | | Evaluation | | | | | | | |
|---|---|---|---|---|---|---|---|---|---|---|---|
| | | Conductive | Coating | | | | (6) | | | (7) | |
| Example | No. | elastic roller No. | material No. | (3) | (4) [μm] | (5) [GPa] | Presence of cracks | Rzjis [μm] | Ry [μm] | Presence of Si—O—M bond | (8) |
| 46 | 46-1 | 1 | 46-1 | A | 0.10 | 0.32 | Yes | 8.3 | 11.3 | Yes | A |
| | 46-2 | | 46-2 | A | 1.00 | 0.32 | Yes | 9.3 | 12.6 | Yes | A |
| | 46-3 | | 46-3 | A | 2.50 | 0.32 | Yes | 10.8 | 14.4 | Yes | A |
| 47 | 47-1 | 1 | 47-1 | A | 0.10 | 19.73 | Yes | 9.3 | 12.6 | Yes | A |
| | 47-2 | | 47-2 | A | 1.00 | 19.73 | Yes | 10.3 | 13.8 | Yes | AA |
| | 47-3 | | 47-3 | A | 2.50 | 19.73 | Yes | 11.8 | 15.7 | Yes | AA |
| 48 | 48-1 | 1 | 48-1 | C | 0.10 | 347.38 | Yes | 13.3 | 17.6 | Yes | AA |
| | 48-2 | | 48-2 | C | 1.00 | 347.38 | Yes | 15.3 | 20.1 | Yes | AA |
| | 48-3 | | 48-3 | C | 2.50 | 347.38 | Yes | 20.3 | 26.3 | Yes | A |
| 49 | 49-1 | 1 | 49-1 | B | 0.05 | 0.10 | Yes | 7.3 | 10.1 | Yes | B |
| | 49-2 | 1 | 49-2 | B | 1.00 | 0.30 | Yes | 8.8 | 11.9 | Yes | A |
| | 49-3 | 1 | 49-3 | B | 3.00 | 0.30 | Yes | 9.3 | 12.6 | Yes | A |
| 50 | 50-1 | 1 | 50-1 | B | 0.05 | 19.73 | Yes | 8.3 | 12.6 | Yes | A |
| | 50-2 | 1 | 50-2 | B | 3.00 | 19.73 | Yes | 12.3 | 16.3 | Yes | AA |
| 51 | 51-1 | 1 | 51-1 | C | 0.05 | 434.66 | Yes | 12.3 | 16.3 | Yes | AA |
| | 51-2 | 1 | 51-2 | C | 1.00 | 434.76 | Yes | 16.3 | 21.3 | Yes | AA |
| | 51-3 | 1 | 51-3 | C | 3.00 | 434.66 | Yes | 26.3 | 35.0 | Yes | C |
| 52 | 52 | 1 | 52 | C | 1.50 | 140.52 | Yes | 14.3 | 18.1 | Yes | AA |
| 53 | 53 | 1 | 53 | C | 1.50 | 145.30 | Yes | 15.2 | 19.3 | Yes | AA |
| 54 | 54 | 1 | 54 | C | 1.50 | 233.39 | Yes | 13.3 | 17.6 | Yes | AA |
| 55 | 55 | 1 | 55 | C | 1.50 | 240.32 | Yes | 13.8 | 18.4 | Yes | AA |
| 56 | 56 | 1 | 56 | C | 1.50 | 220.57 | Yes | 12.2 | 16.9 | Yes | AA |
| 57 | 57 | 1 | 57 | C | 1.50 | 245.98 | Yes | 14.6 | 18.8 | Yes | AA |
| 58 | 58 | 1 | 58 | B | 1.50 | 321.50 | Yes | 14.3 | 18.3 | Yes | AA |
| 59 | 59 | 1 | 59 | B | 1.50 | 300.25 | Yes | 11.3 | 15.3 | Yes | AA |
| 60 | 60-1 | 2 | 60 | B | 2.00 | 347.38 | Yes | 13.7 | 18.4 | Yes | AA |
| | 60-2 | 3 | | B | 2.00 | 347.38 | Yes | 11.5 | 15.0 | Yes | AA |
| | 60-3 | 4 | | B | 2.00 | 347.38 | Yes | 21.5 | 26.2 | Yes | AA |
| | 60-4 | 5 | | B | 2.00 | 347.38 | Yes | 15.8 | 19.2 | Yes | AA |
| | 60-5 | 6 | | B | 2.00 | 347.38 | Yes | 6.2 | 9.3 | Yes | C |
| | 60-6 | 7 | | B | 2.00 | 347.38 | Yes | 9.5 | 12.8 | Yes | AA |

Comparative Example 1

Preparation of Coating Materials 61-1 to 61-3 for Forming a Surface Layer

Coating materials 61-1 to 61-3 for forming a surface layer were prepared in the same manner as in coating materials 1-1 to 1-3 except that condensate 61 was used.

<Evaluation and Formation of Surface Layer>

Charging rollers 61-1 to 61-3 were prepared in the same manner as in Example 1 except that coating materials 61-1 to 61-3 were used, and then subjected to evaluations (3) to (8).

The evaluation results are shown in Table 16.

TABLE 16

| | | Charging roller | | Evaluation | | | | | | | |
|---|---|---|---|---|---|---|---|---|---|---|---|
| | | Conductive | Coating | | | | (6) | | | (7) | |
| Comparative Example | No. | elastic roller No. | material No. | (3) | (4) [μm] | (5) [GPa] | Presence of cracks | Rzjis [μm] | Ry [μm] | Presence of Si—O—M bond | (8) |
| 1 | 61-1 | 1 | 61-1 | A | 0.10 | 0.10 | No | 6.3 | 8.8 | No | D |
| | 61-2 | | 61-2 | A | 1.00 | 0.10 | No | 5.3 | 7.8 | No | D |
| | 62-3 | | 62-3 | A | 2.50 | 0.10 | No | 4.1 | 6.2 | No | D |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims a priority from Japanese Patent Application No. 2010-215811 filed on Sep. 27, 2010, the content of which is incorporated as a part of the application by reference.

What is claimed is:

1. A charging member comprising a supporting member, an elastic layer and a surface layer, wherein the surface layer comprises a polymer compound having a Si—O-M bond, the polymer compound has at least one structural unit selected from structural units represented by a general formula (1) and a general formula (2) below, and the polymer compound has a structural unit represented by a general formula (3) below; and wherein the charging member has a crack extending from the surface thereof into the elastic layer, and the crack has a convexly raised edge by which the surface of the charging member is roughened:

$MO_{4/2}$ General formula (1)

wherein, M represents an element selected from the group consisting of Ti, Zr and Hf;

$MO_{5/2}$ General formula (2)

wherein, M represents an element Ta;

General formula (3)

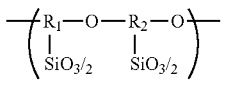

wherein, $R_1$ and $R_2$ each independently represent a general formula (5) below:

General formula (5)

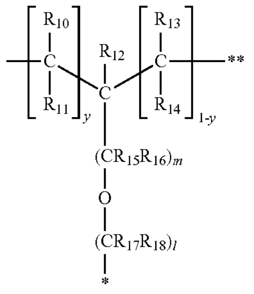

wherein, $R_{10}$ to $R_{14}$, each independently represent a hydrogen atom, an alkyl group having 1 to 4 carbon atoms, a hydroxy group, a carboxyl group or an amino group; $R_{15}$ to $R_{18}$, each independently represent a hydrogen atom or an alkyl group having 1 to 4 carbon atoms; m and l each independently represent an integer of 1 to 8; y represents 0 or 1; a reference symbol "*" represents a binding site to a silicon atom of the $SiO_{3/2}$ units in the general formula (3); and a reference symbol "**" represents an oxygen atom in the chain of $R_1$—O—$R_2$—O in the general formula (3), wherein the polymer compound is a cross-linked product of a hydrolyzed condensate of a hydrolyzable compound having a structure represented by a general formula (12) below, and a general formula (13) below:

$R_{33}—Si(OR_{34})(OR_{35})(OR_{36})$ General formula (12):

$Ti(OR_{37})(OR_{38})(OR_{39})(OR_{40})$ General formula (13):

wherein, $R_{33}$ represents a general formula (18) below; $R_{34}$ to $R_{36}$ each independently represent an alkyl group having 1 to 4 carbon atoms; and $R_{37}$ to $R_{40}$ each independently represent an alkyl group having 1 to 9 carbon atoms;

General formula (18)

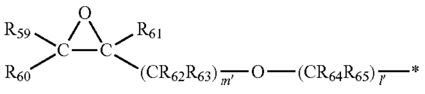

wherein, $R_{59}$ to $R_{65}$ each independently represent a hydrogen atom, an alkyl group having 1 to 4 carbon atoms, a hydroxy group, a carboxyl group or an amino group; $R_{62}$ to $R_{65}$ each independently represent a hydrogen atom or an alkyl group having 1 to 4 carbon atoms; m' and l' each independently represent an integer of 1 to 8; and a reference symbol "*" indicates a binding site with a silicon atom of the general formula (12), and wherein the raised edge crack is a cure shrinkage contraction force crack of the hydrolyzed condensate while on the elastic layer, whereby the crack extends into the elastic layer as a result of the contraction force of cure shrinkage cross-linking.

2. The charging member according to claim 1, wherein in the polymer compound, $R_1$ and $R_2$ of the general formula (3) are each independently represented by a general formula (9) below:

General formula (9)

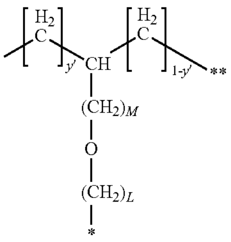

wherein M and L each independently represent an integer of 1 to 8; y' represents 0 or 1; and a reference symbol "*" and a reference symbol "**" respectively represent binding sites to a silicon atom and an oxygen atom in the general formula (3).

3. The charging member according to claim 1, wherein an atomic-number ratio of M to silicon (M/Si) is 0.10 to 12.50 in the totality of the polymer compound.

4. The charging member according to claim 1, wherein the polymer compound is a cross-linked product of a hydrolyzed condensate of a hydrolyzable compound having a structure represented by the general formula (12), a hydrolyzable compound having a structure represented by a general formula (21) below:

$R_{80}—Si(OR_{81})(OR_{82})(OR_{83})$ General formula (21):

wherein, $R_{80}$ represents an alkyl group having 1 to 21 carbon atoms or a phenyl group and $R_{81}$ to $R_{83}$ each independently represent an alkyl group having 1 to 4 carbon atoms, and a hydrolysable compound having a structure represented by the general formula (13).

5. A method for manufacturing the charging member according to claim 1, comprising (i) obtaining a liquid-state condensate comprising a hydrolyzed condensate of a hydrolyzable compound having a structure represented by the general formula (12) and a hydrolysable compound having a structure represented by the general formula (13)

(ii) obtaining a coating material for forming a surface layer comprising the liquid-state condensate and a photopolymerization initiator, and (iii) forming a coating film of the coating material on an elastic layer provided on the outer periphery of a supporting member, crosslinking the hydrolyzed condensates by cleaving an epoxy group at $R_{33}$ of the hydrolyzed condensate in the coating film, and forming the surface layer.

6. A method for manufacturing the charging member according to claim 4, comprising (i) obtaining a liquid-state condensate comprising a hydrolyzed condensate of a hydrolyzable compound having a structure represented by the above general formula (12), a hydrolyzable compound having a structure represented by the general formula (21), and a hydrolysable compound having a structure represented by the general formula (13)

(ii) obtaining a coating material for forming a surface layer comprising the liquid-state condensate and a photopolymerization initiator, and (iii) forming a coating film of the coating material on an elastic layer provided on the outer periphery of a supporting member, crosslinking the hydrolyzed condensate by cleaving an epoxy group at $R_{33}$ of the hydrolyzed condensate in the coating film to cure the coating film and forming the surface layer.

7. The charging member according to claim 1, wherein the hydrolyzable compound represented by the general formula (12) of which $R_{33}$ represents any one of general formulas (17) to (20), is at least one selected from the group consisting of 2-(3,4-epoxycyclohexyl)ethyltrimethoxysilane, 2-(3,4-epoxycyclohexyl)ethyl triethoxysilane, 3-(3,4-epoxycyclohexyl)methyloxypropyltrimethoxysilane, and 3-(3,4-epoxycyclohexyl)methyloxypropyltriethoxysilane.

8. The charging member according to claim 1, wherein the surface layer has a thickness of from 0.10 to 2.50 μm.

9. The charging member according to claim 8, wherein the surface layer has a thickness of from 0.15 to 2.00 μm.

* * * * *